(12) United States Patent
Nimbalker et al.

(10) Patent No.: US 12,069,764 B2
(45) Date of Patent: Aug. 20, 2024

(54) CONDITIONAL WAKE-UP SIGNAL CONFIGURATION FOR NEW RADIO

(71) Applicant: Telefonaktiebolaget LM Ericsson (PUBL), Stockholm (SE)

(72) Inventors: Ajit Nimbalker, Fremont, CA (US); Pramod Jacob Mathecken, Lomma (SE); Ravikiran Nory, San José, CA (US); Ali Nader, Malmö (SE); Sina Maleki, Malmö (SE); Andres Reial, Lomma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 652 days.

(21) Appl. No.: 17/416,170

(22) PCT Filed: Dec. 23, 2019

(86) PCT No.: PCT/SE2019/051344
§ 371 (c)(1),
(2) Date: Jun. 18, 2021

(87) PCT Pub. No.: WO2020/130930
PCT Pub. Date: Jun. 25, 2020

(65) Prior Publication Data
US 2022/0078879 A1 Mar. 10, 2022

Related U.S. Application Data

(60) Provisional application No. 62/784,114, filed on Dec. 21, 2018.

(51) Int. Cl.
H04W 52/02 (2009.01)
H04W 76/28 (2018.01)

(52) U.S. Cl.
CPC ....... *H04W 76/28* (2018.02); *H04W 52/0229* (2013.01)

(58) Field of Classification Search
CPC ............. H04W 76/28; H04W 52/0229; H04W 52/0216; H04W 52/0235; H04W 76/25; Y02D 30/70
See application file for complete search history.

(56) References Cited

U.S. PATENT DOCUMENTS

2016/0007292 A1 1/2016 Weng et al.
2018/0097598 A1 4/2018 Ang et al.
(Continued)

FOREIGN PATENT DOCUMENTS

CN 108370602 A 8/2018
JP 2015 154255 A 8/2015
(Continued)

OTHER PUBLICATIONS

3GPP TSG RAN WG1 Meeting #93; Busan, Korea, May 21-25, 2018; Agenda Item: 6.2.7.1.1.2; Source: LG Electronics; Title: Discussion on wake up signal configurations and procedures in NB-Iot (R1-1806589).
(Continued)

Primary Examiner — Joseph E Dean, Jr.
(74) Attorney, Agent, or Firm — Baker Botts L.L.P.

(57) ABSTRACT

A method by a wireless device (510) configured for Discontinuous Reception, DRX, includes monitoring (1602) for a first wakeup signal, WUS, during a first WUS monitoring occasion. In response to the wireless device detecting the first WUS during the first WUS monitoring occasion, the wireless device monitors (1604) a downlink control channel during a downlink control channel monitoring occasion associated with the detected first WUS and abstains (1604)
(Continued)

from monitoring for a second WUS in a second WUS monitoring occasion based on a condition.

26 Claims, 27 Drawing Sheets

(56) References Cited

U.S. PATENT DOCUMENTS

| | | | |
|---|---|---|---|
| 2019/0239189 A1 | 8/2019 | Hwang et al. | |
| 2021/0037465 A1 | 2/2021 | Mazloum et al. | |

FOREIGN PATENT DOCUMENTS

| | | | | |
|---|---|---|---|---|
| JP | 2020 501431 A | 1/2020 | | |
| JP | 2021 524177 A | 9/2021 | | |
| WO | 2018 174635 A1 | 9/2018 | | |
| WO | WO-2018174635 A1 * | 9/2018 | ............ | H04W 52/02 |
| WO | WO2018204799 A1 | 11/2018 | | |
| WO | 2019 216808 A1 | 11/2019 | | |
| WO | 2020 064710 A1 | 4/2020 | | |
| WO | 2020 064770 A1 | 4/2020 | | |

OTHER PUBLICATIONS

Search Report issued for Chinese Application Serial No. 2019800926773—Nov. 20, 2023.
Office Action issued for Chinese Application Serial No. 201980092677.3—Nov. 22, 2023.
Notice of Allowance issued for Patent application No. Japanese Patent Application 2021-535952—Sep. 16, 2020.
3GPP TSG-RAN WG1 Meeting #96; Athens, Greece; Source: Ericsson; Title: Evaluation and modelling of UE power consumption (Tdoc R1-1902934)—Feb. 25-Mar. 1, 2019.
3GPP TSG-RAN WG2 #104; Spokane, US; Source: Ericsson; Title: On DRX for NTN (Tdoc R2-1817750)—Nov. 12-16, 2018.
3GPP TSG-RAN WG2 Meeting #107; Prague, Czech Republic; Source: Spreadtrum Communications; Title: Wakeup signaling in DRX (R2-1909085)—Aug. 26-30, 2019.
Official Action for Application Serial No. NC2021/0009333 issued by the Republic of Columbia Superintendence of Industry and Commerce—Dec. 28, 2023.
PCT International Preliminary Report on Patentability issued for International application No. PCT/SE2019/051344—May 11, 2021.
PCT International Search Report issued for International application No. PCT/SE2019/051344—Mar. 17, 2020.
PCT Written Opinion of the International Searching Authority issued for International application No. PCT/SE2019/051344—Mar. 17, 2020.
3GPP TSG RAN WG1 Meeting #95; Spokane, USA; Source: InterDigital, Inc.; Title: Discussion on Triggering of Power Mode Adaptation (R1-1813244)—Nov. 12-16, 2018.

* cited by examiner

CONDITIONAL WAKE-UP SIGNAL CONFIGURATION FOR NEW RADIO

PRIORITY

This nonprovisional application is a U.S. National Stage Filing under 35 U.S.C. § 371 of International Patent Application Serial No. PCT/SE2019/051344 filed Dec. 23, 2019 and entitled "Conditional Wake-Up Signal Configuration for New Radio" which claims priority to U.S. Provisional Patent Application No. 62/784,114 filed Dec. 21, 2018 both of which are hereby incorporated by reference in their entirety.

BACKGROUND

A New radio (NR) standard in 3GPP is being designed to provide service for multiple use cases such as enhanced mobile broadband (eMBB), ultra-reliable and low latency communication (URLLC), and machine type communication (MTC). Each of these services has different technical requirements. For example, the general requirement for eMBB is a high data rate with moderate latency and moderate coverage, while URLLC service requires a low latency and high reliability transmission but perhaps for moderate data rates.

One of the solutions to provide low latency data transmissions is to use shorter transmission time intervals. In NR, in addition to transmissions in a slot, a mini-slot transmission is also allowed to reduce latency. A mini-slot may consist of any number of 1 to 14 Orthogonal Frequency Division Multiplexing (OFDM) symbols. It should be noted that the concepts of slot and mini-slot are not specific to a specific service. For example, a mini-slot may be used for either eMBB, URLLC, or other services. FIG. 1 illustrates an exemplary radio resource in NR.

UE power consumption is another important metric. It is desirable to continue to reduce power consumption while providing better latency, reliability, coverage, and data rates. In general, significant power can be spent on monitoring the Physical Downlink Control Channel (PDCCH) in Long-term Evolution (LTE) based on a discontinuous reception (DRX) setting from LTE field logs. A similar problem may also exist in NR if similar DRX settings with traffic modelling are utilized. For example, the user equipment (UE) may need to perform blind detection in its configured control resource sets (CORESETs) to identify whether there is a PDCCH sent to it, and act accordingly. Techniques that can reduce unnecessary PDCCH monitoring or allow the UE to go to sleep or wake-up only when required can be beneficial and reduce power consumption.

There currently exist certain challenge(s). For example, existing approaches for transmitting and monitoring for wakeup signals (WUS) may exhibit robustness issues. For example, if a network node sends a WUS to a UE and the UE misses it due to, for example, bad coverage, and remains in sleep state for extended periods of time, network node resources are wasted. Additionally, latency is increased because the network node must wait until the next opportunity to transmit a WUS transmission before having the chance to transmit information to the UE. Moreover, if the WUS resource configuration is not appropriate for the channel condition for the UE, the UE may miss the WUS on multiple occasions, compounding the increased latency problem and degrading the overall user experience unless the network node can suitably reconfigure the WUS (e.g. by having higher aggregation levels, etc).

SUMMARY

Certain aspects of the present disclosure and their embodiments may provide solutions to these and/or other challenges.

According to certain embodiments, a method by a wireless device configured for Discontinuous Reception (DRX) includes monitoring for a first wakeup signal (WUS) during a first WUS monitoring occasion. In response to the wireless device detecting the first WUS during the first WUS monitoring occasion, the wireless device monitors a downlink control channel during a downlink control channel monitoring occasion associated with the detected first WUS and abstains from monitoring for a second WUS in a second WUS monitoring occasion based on a condition.

According to certain embodiments, a method performed by a wireless device configured with DRX includes monitoring for a first WUS during a first WUS monitoring occasion. In response to not detecting the first WUS during the first WUS monitoring occasion, the wireless device determines whether a condition is met and, based on determining that the condition was met, monitors the downlink control channel during a downlink control channel monitoring occasion associated with the first WUS monitoring occasion.

According to certain embodiments, a method performed by a network node includes transmitting a first WUS to a wireless device configured with DRX during a first WUS monitoring occasion. The method further includes transmitting a downlink signal on a downlink control channel during a downlink control channel monitoring occasion associated with the first WUS monitoring occasion and abstaining from transmitting a second WUS to the wireless device until after a predetermined period of time.

According to certain embodiments, a method performed by a network node includes transmitting, to a wireless device configured with DRX, information indicating that in response to the wireless device failing to detect a first WUS during a first WUS monitoring occasion and at least one condition being met, the wireless device is to monitor a downlink control channel during a downlink control channel monitoring occasion associated with the first WUS monitoring occasion.

According to certain embodiments, a wireless device configured for DRX includes processing circuitry configured to monitor for a first WUS during a first WUS monitoring occasion. In response to the wireless device detecting the first WUS during the first WUS monitoring occasion, the processing circuitry is configured to monitor a downlink control channel during a downlink control channel monitoring occasion associated with the detected first WUS and abstain from monitoring for a second WUS in a second WUS monitoring occasion based on a condition.

According to certain embodiments, a wireless device configured for DRX includes processing circuitry configured to monitor for a first WUS during a first WUS monitoring occasion. In response to not detecting the first WUS during the first WUS monitoring occasion, the processing circuitry is configured to determine whether a condition is met and based on determining that the condition was met, monitor the downlink control channel during a downlink control channel monitoring occasion associated with the first WUS monitoring occasion.

According to certain embodiments, a network node includes processing circuitry configured to transmit a first WUS to a wireless device configured for DRX during a first WUS monitoring occasion. The processing circuitry is configured to transmit a downlink signal on a downlink control channel during a downlink control channel monitoring occasion associated with the first WUS and abstain from transmitting a second WUS to the wireless device until after a predetermined period of time.

According to certain embodiments, a network node includes processing circuitry configured to transmit, to a wireless device configured for DRX, information indicating that in response to the wireless device failing to detect a first WUS during a first WUS monitoring occasion and at least one condition being met, the wireless device is to monitor a downlink control channel during a downlink control channel monitoring occasion associated with the first WUS monitoring occasion.

Certain embodiments may provide one or more of the following technical advantage(s). For example, certain embodiments may enable conditional WUS operation, which may reduce power consumption and latency. As another example, certain embodiments may improve robustness when the WUS is missed at the wireless device due to bad coverage or insufficient WUS resources in certain scenarios (e.g., if the link quality is degraded such that the configured WUS resources are inadequate to maintain good WUS detection performance). As still another example, certain embodiments may avoid unnecessary interruption/delays in Physical Downlink Control Channel (PDCCH) monitoring in case of missed detection of WUS at the wireless device. As yet another example still, certain embodiments may also reduce resource wastage in WUS reconfiguration.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
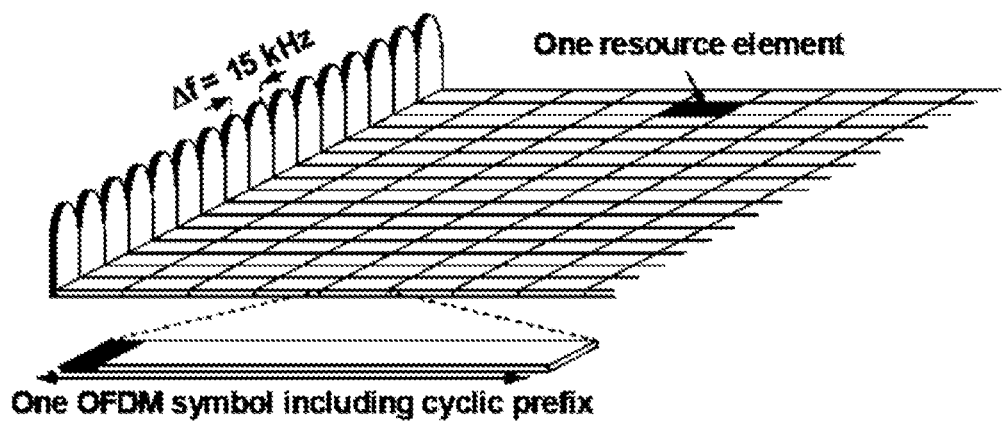
FIG. 1 illustrates an exemplary radio resource in New Radio (NR)

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Several embodiments of wake up signal (WUS) configurations and monitoring techniques for improved WUS operation are described in detail below. For the purposes of this disclosure, the term "wakeup signal" is used to refer to any suitable signal, such as a power saving signal or signal for saving power. Additionally, references herein to a User Equipment (UE) are merely exemplary and any suitable wireless device may be configured to implement the various embodiments discussed herein.

According to certain embodiments, a conditional WUS operation is provided, wherein if a wireless device such as, for example, a UE does not detect the WUS in a WUS monitoring occasion, the UE may determine whether or not to monitor a Physical Downlink Control Channel (PDCCH) based on an additional condition such as, for example, a Reference Signal Received Power (RSRP) condition or a WUS decoder reliability metric, thereby providing additional robustness when reliable detection of WUS cannot be ensured. As another example, certain embodiments may include the UE skipping monitoring of the WUS in a WUS occasion (or in one or more future WUS occasions) such as, for example, when the UE is in active time or when an inactivity timer is running. As yet another example, a network node configured parameter (such as a WUS Monitoring occasion counter value) may be used so that the network can confidently configure a low aggregation level without risking losing the UE when it moves out of coverage of the WUS.

According to certain embodiments, conditions on top of the conventional WUS operation are used to ensure recovery from unnecessary delays/robustness issues in WUS monitoring. For example, with the 'successful/unsuccessful WUS detection' criterion, the UE may use another reliability condition (e.g. whether RSRP measured by the UE is above/below a certain threshold, or whether WUS-PDCCH decoder's internal information suggests a presence of a compatibly encoded PDCCH) to determine whether to monitor/skip monitoring PDCCH in PDCCH monitoring occasion(s) corresponding to the WUS monitoring occasion. As another example, if a WUS monitoring occasion overlaps with a time slot where the UE is monitoring PDCCH such as, for example, when the UE is in active time, the UE may skip WUS monitoring in that WUS monitoring occasion and network node may skip WUS transmission in that WUS monitoring occasion.

According to certain embodiments, the UE may receive information in PDCCH Downlink Control Indicator or Downlink Control Information (DCI) (e.g. in PDCCH scheduling UL/DL data for the UE) or a MAC Control Element, indicating whether the UE needs to monitor WUS in subsequent WUS monitoring occasions, e.g., dynamic/semi-dynamic enabling/disabling of WUS monitoring. The network node may determine when the UE needs to monitor the WUS based on its own assessment of propagation conditions of the UE (e.g., based on CQI reports, RSRP/RSRQ measurement reports etc.) or in coordination with capabilities reported by the UE (e.g., UE has indicated that it supports WUS and furthermore benefits from it).

If the UE exits the WUS monitoring state for any reason (e.g., the RSRP falls below a threshold previously configured by the network node via dedicated/broadcast signaling), the UE can inform the network that it has exited WUS monitoring state, according to certain embodiments. For example, when UE exits the WUS monitoring state, the UE may follow the PDCCH monitoring procedure as if WUS is not configured for that UE. Additionally, or alternatively, the network node may reconfigure new WUS resources for the UE. Such reconfiguration may either be based on channel condition report from UE upon exiting WUS monitoring state and/or based on network node's own assessment of the channel conditions upon later communications.

According to certain embodiments, WUS resource configuration can include one or more relative time offsets. For example, as one example, the time offset may include X symbols and/or slots before or relative to an ON duration. In a particular embodiment, X can be 0. In Time Division Duplexing (TDD), X may be the latest downlink (DL) slot or a DL symbol in a slot that is X slots and/or symbols before ON duration. The relative time offset can be used to determine time offset from the time of WUS reception to the time when UE is required to start monitoring PDCCH in an ON duration corresponding to WUS monitoring occasion where WUS is detected. In certain embodiments, there may be one or more sets of latent WUS resources configured in the UE, in addition to the active WUS resource. The network node may then, via short commands such as Medium Access Control-Control Elements (MAC-CEs) or Downlink Control Information (DCIs), order the UE to shift its configuration to, for example, one of the latent WUS resources.

Figure 2:
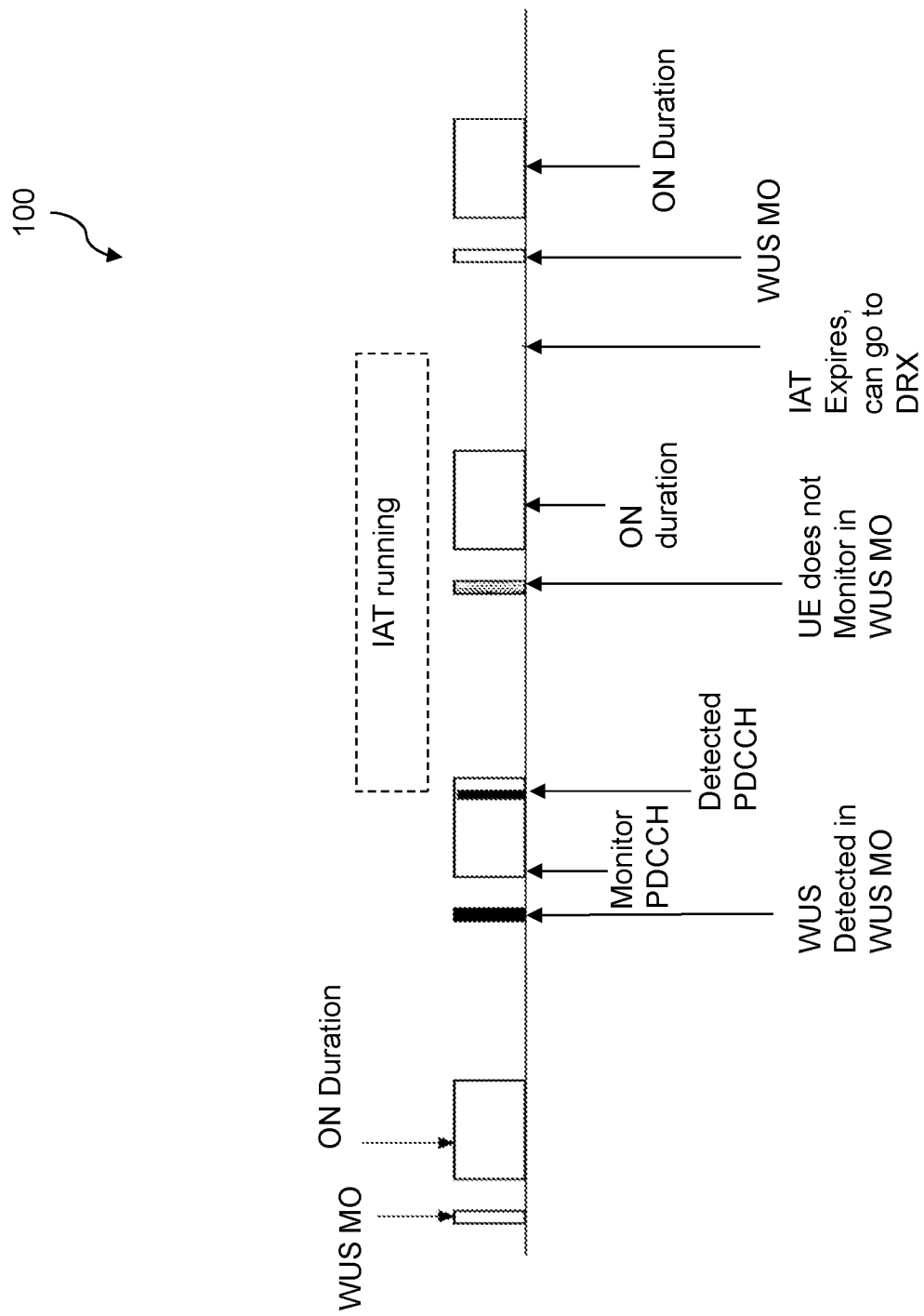
FIG. 2 illustrates an example wake up signal (WUS) operation, according to certain embodiments

According to certain embodiments, a wireless device such as, for example, a UE can be configured with Discontinuous Reception (DRX) and WUS resources. The UE may determine whether to attempt to detect WUS in a monitoring occasion based on a condition. FIG. 2 illustrates a particular example, which will be described in further detail below.

According to certain embodiments, if the UE is configured with WUS resources, the UE may monitor (i.e., attempt to detect) a WUS in a WUS monitoring occasion. In particular embodiments, the WUS monitoring occasion may be at the beginning of a DRX ON duration, or before a DRX ON duration. For example, an offset relative to ON duration may be configured to indicate when the WUS monitoring occasion is relative to DRX ON duration.

According to certain embodiments, if the UE detects a WUS in a WUS monitoring occasion, the UE may monitor the PDCCH during the PDCCH monitoring occasion(s) associated with the WUS monitoring occasion. If the UE detects a PDCCH during the PDCCH monitoring occasion such as, for example, within a DRX ON duration associated with the WUS monitoring occasion, the UE may continue to monitor the PDCCH. For example, the UE may continue to monitor the PDCCH until end of active time or until expiration of Inactivity timer (TAT). In a particular embodiment, the monitoring performed by the UE may include decoding PDCCH candidates to detect a PDCCH intended for the UE.

In a particular embodiment, an association between a WUS monitoring occasion and a PDCCH monitoring occasion may be preconfigured by the network or a network node. As used herein, the term network node refers to any interface between the wireless device and the wireless network, such as an evolved NodeB, a gNB, or any other base station. In some cases, the UE may be dynamically configured using information from the WUS of when the UE should monitor the first PDCCH such as, for example, after N slots or the end of a time counter.

Alternatively, according to a particular embodiment, the WUS or one of the scheduling PDCCH occasions may indicate when the UE can stop monitoring PDCCH.

According to certain embodiments, the UE need not monitor for the WUS during WUS monitoring occasions that overlap the slots when the UE is monitoring the PDCCH (e.g., during "active time"). On the network node side, the network node does not need send a WUS in a WUS monitoring occasion if the network node knows the UE is already monitoring the PDCCH in a time slot overlapping that monitoring occasion.

Furthermore, according to certain embodiments, the UE need not monitor WUS during occasions reserved for other activities. For example, the UE may not need to monitor for a WUS during measurement gaps, UL slots, etc. In some embodiments, the network node may provide a specific configuration to the UE that informs the UE that WUS monitoring is cancelled in certain occasions (slot/symbols). As mentioned further below, such cancelled occasions may imply, in some instances, that normal PDCCH monitoring shall apply for the UE.

In a particular embodiment, after the end of the PDCCH monitoring duration (e.g., end of "active time"), the UE may resume monitoring for the WUS at WUS monitoring occasion(s) corresponding to subsequent PDCCH monitoring duration(s) (e.g., subsequent ON duration(s)).

In a particular embodiment, if the UE does not detect a WUS in a WUS monitoring occasion, the UE may skip PDCCH monitoring during the PDCCH monitoring occasion (e.g., an occasion during the DRX ON-duration) associated with the WUS monitoring occasion and continue to monitor WUS in subsequent WUS monitoring occasion(s).

According to certain particular embodiments, a single WUS occasion may be associated with multiple PDCCH monitoring occasions (e.g., multiple DRX ON-durations). In such cases, the above behaviour may be applied to all the DRX ON-durations associated to the single WUS monitoring occasion.

According to certain embodiments, if the IAT expires before an ON duration (or the "active time") expires, but at or after a WUS occasion or slot within the WUS occasion, the UE may monitor the PDCCH in the ON duration.

According to certain embodiments, if the UE is not monitoring for a WUS in a WUS monitoring occasion, the UE may monitor the PDCCH in the associated PDCCH monitoring occasions.

FIG. 2 illustrates an example WUS operation, according to certain embodiments. More specifically, FIG. 2 illustrates an example where a wireless device, such as a UE, does not monitor WUS in a WUS occasion based on a condition such as, for example, the IAT running.

According to certain embodiments, the UE may be configured with a conditional WUS operation. For example, certain embodiments described above include a procedure in which the UE skips monitoring the PDCCH in PDCCH monitoring occasion(s) (e.g. DRX ON duration(s)), corresponding to the WUS monitoring occasion if the UE does not detect WUS in a WUS monitoring occasion. However, the reliability of WUS detection may depend on the UE propagation channel condition between the network node (e.g., a new radio network node, such as a gNB) that is transmitting the WUS and the UE and/or a detection threshold which may be fixed or adaptive for the corresponding WUS detector. In circumstances where WUS detection is less reliable, it may be desirable for the UE not to solely rely on a 'unsuccessful WUS detection' in a WUS monitoring occasion as the criterion for skipping PDCCH monitoring in PDCCH monitoring occasions(s) associated with that WUS monitoring occasion. A missed detection of a WUS may lead to increased latency and packet losses of data traffic that the UE is scheduled to receive. When WUS detection is reliable, the UE may rely on the WUS detection and achieve power savings.

Accordingly, according to embodiments, if the conditions for reliable WUS detection are not present, a UE, even though configured for WUS reception, may not skip PDCCH monitoring in a PDCCH monitoring occasion when a WUS is not detected in the WUS monitoring occasion(s) corresponding to that PDCCH monitoring occasion(s). This may result in the UE monitoring PDCCH even if a WUS was not sent to the UE.

From the network node perspective, including the above functionality may enable it to use a more aggressive link adaptation when transmitting WUS. In certain embodiments, if the network node uses a PDCCH structure to transmit WUS, instead of choosing the highest possible aggregation level for a WUS to ensure reliable detection at the UE, the network node may send WUS using a lower aggregation level, and rely on the UE to not use the 'unsuccessful WUS detection' in a WUS monitoring occasion as a criterion for skipping PDCCH monitoring, if the UE determines that WUS detection is unreliable for that aggregation level.

Several techniques may be applied to determine the conditions on which the UE conditionally monitors the PDCCH based on the WUS, as detailed below.

Figure 3:
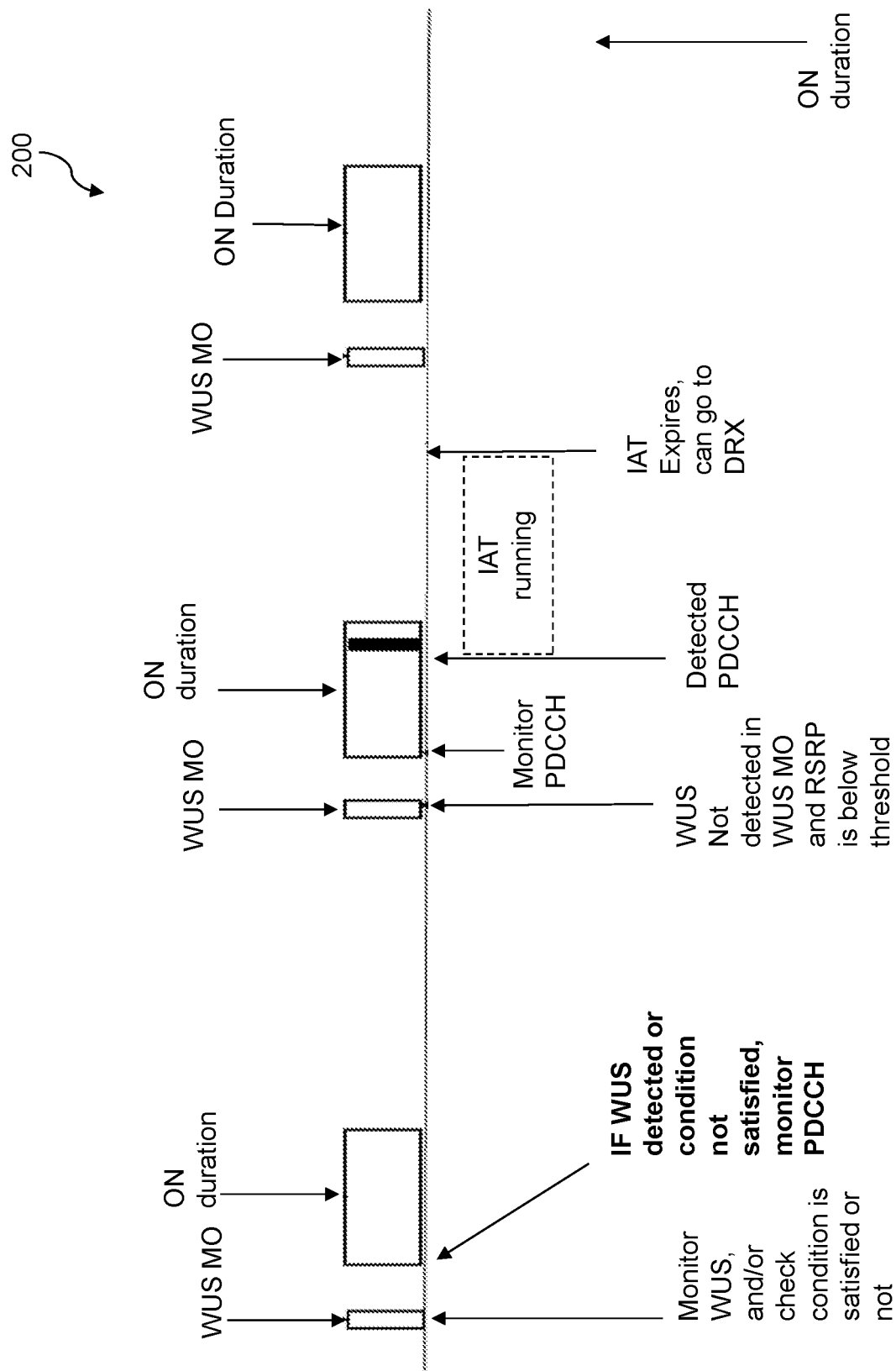
FIG. 3 illustrates a conditional WUS operation, including an example where a wireless device monitors a Physical Downlink Control Channel (PDCCH) based on an additional condition, according to certain embodiments.

For example, according to a particular embodiment, a UE may be configured with DRX and WUS resources. The UE may be configured to use a conditional WUS operation to determine whether to monitor the PDCCH. FIG. 3 illustrates an example of a conditional WUS operation, according to certain embodiments. More specifically, FIG. 3 illustrates an example where a UE monitors the PDCCH based on an additional condition, according to certain embodiments.

In a particular embodiment, the WUS configuration may include one or more of: an RSRP threshold X, an RSRP measurement signal, and/or a resource. The RSRP measurement signal can be a Synchronization Signal Block (SSB) and/or periodic or aperiodic CSI-RS resource and/or a Tracking Reference Signal (TRS). The RSRP measurement signal can also be a resource that is configured to provide the UE time/frequency synchronization information. Alternatively, in a particular embodiment, instead of a RSRP threshold, a RSRQ measurement signal and a RSRQ threshold can also be used. In some particular embodiments, both RSRP and RSRQ can be used together. A CSI threshold or a hypothetical WUS Block Error Rate (BLER) threshold or in-sync or out-of-sync indications as part of Radio Link Monitoring (RLM) procedure can also be considered as a quality metric for evaluation conditions based a configured measurement signal such as a SSB or a Channel State Information-Reference Signal (CSI-RS) resource and/or a TRS.

As used in this disclosure, "RSRP" may be SS-RSRP and/or CSI-RSRP and/or RSRP on a specified signal. Also, "RSRQ" may be SS-RSRQ and/or CSI-RSRQ and/or RSRQ on a specified signal. Additionally, the RSRP and/or the RSRQ can be based on L1 RSRP or higher layer filtered RSRP or RSRQ (e.g., L3 filtered), in a particular embodiment.

According to certain embodiments, the CSI condition can be based on measurement on a periodic CSI-RS resource and/or an aperiodic CSI-RS resource. For example, an aperiodic CSI-RS resource may be transmitted in an aperiodic CSI-RS resource occasion associated with WUS monitoring occasion.

In particular embodiments, the condition may be based on a synchronization condition such as an Out-of-Sync (OOS) or In-Sync event or a few In-Sync indications to upper layers (e.g., configured number X) and/or a few Out-of-Sync indications to upper layers (e.g., configured number Y) that may occur during RLM process.

In particular embodiments, the condition on which the conditional WUS operation may be based may include one or more of the above conditions.

For the sake of simplicity, and not to be construed as limiting the present invention, further descriptions of the various embodiments refer to using RSRP measurements and thresholds, but any of the other described conditions described above may be used, alone or in any suitable combination, for the conditional WUS operation.

According to certain embodiments including conditional WUS operation, the UE may be configured with WUS resources and monitor for a WUS in a WUS monitoring occasion corresponding to a PDCCH monitoring occasion such as, for example, a DRX ON duration (e.g. offset relative to ON duration is configured).

According to certain embodiments, the UE may detect a WUS in a WUS monitoring occasion and then monitor the PDCCH during the corresponding ON duration. Then, if the UE detects PDCCH, the UE may continue monitoring the PDCCH until end of active time. The UE may not monitor for a WUS in any WUS monitoring occasions that occur during active time. If the UE does not detect PDCCH during ON duration, for example, the UE may monitor for a WUS in next WUS monitoring occasion.

According to certain embodiments, the UE may not detect WUS in a WUS monitoring occasion before a DRX ON duration. Instead of only relying on the lack of detecting a WUS, the UE may further determine if the RSRP is larger than a RSRP threshold. If the RSRP exceeds the threshold, the UE may skip PDCCH monitoring for this ON duration and monitor for a WUS before the next ON duration. If the RSRP is lower than the threshold, the UE may monitor the PDCCH occasion during the ON duration even if a WUS is not detected in the WUS monitoring occasion, in a particular embodiment.

As shown in the example above, according to certain embodiments, if the UE does not detect a WUS in a WUS monitoring occasion, the UE may apply a condition such as, for example, the RSRP threshold determination, to determine whether to wake-up and monitor the PDCCH or not monitor the PDCCH during the PDCCH monitoring occasion(s) corresponding to the WUS monitoring occasion.

A WUS occasion that is right before (e.g., a configured offset relative to an ON duration) can be associated with that ON duration. According to certain embodiments, a single WUS occasion may be associated with multiple PDCCH monitoring occasions (e.g., multiple DRX ON-durations). In such cases, the above described behaviour by the UE may be applied to all the DRX ON-durations associated to the single WUS monitoring occasion.

According to certain embodiments, if the IAT expires before an ON duration (or the "active time") expires but at or after a WUS occasion or slot within the WUS occasion, the UE can monitor PDCCH in the ON duration.

According to certain embodiments, if the UE is not monitoring WUS in a WUS monitoring occasion, the UE may monitor the PDCCH in the associated PDCCH monitoring occasions.

According to certain embodiments, multiple RSRP thresholds may be applied. More generally, the network node can configure different conditions for WUS reliability for different WUS monitoring occasions. As a specific example, different configurations may apply to different carrier bandwidth parts (BWPs).

As described above with respect certain embodiments, WUS resource configuration can include one or more relative time offsets (e.g., X slots before On duration). In a particular embodiment, for example, X can be 0. In TDD, X may be the latest DL slot that is X slots before On duration, in a particular embodiment. Alternatively, in TDD, X can be the latest DL slot or a DL symbol in a slot that is X slots/symbols before ON duration. According to certain embodiments, the relative time offset may be used to determine time offset from the time of WUS reception to the time when UE is required to start monitoring PDCCH in an ON duration corresponding to WUS monitoring occasion where WUS is detected.

According to certain embodiments, the WUS and PDCCH frequency resources may be different. For example, the WUS resources might be configured in the same frequency location (or BWP) where the SSB resides, whereas the PDCCH might be configured in another frequency location.

According to certain embodiments, based on RSRP reporting, a network node may determine if the configured WUS resource for a UE is adequate or needs to be adapted. However, if the UE detects that the RSRP has fallen below a threshold, the UE may send an indication to the network node requesting configuration of a new WUS resource, in a particular embodiment. For example, the triggered indication may be based on L1 measurement report, based on new RRC configured measurement event (e.g. WUS BLER exceeds certain level), based on network node assessment of channel, or explicitly indicated by the UE via UL control channel PUCCH or through a random-access procedure (e.g., optionally with predefined preamble), in various particular embodiments.

Accordingly, as described above, various embodiments have been described that allow for conditional WUS operation.

According to certain other embodiments, the WUS mechanism may be made more robust to avoid missing detection, by configuring the UE to send a feedback called WUS-acknowledgment (WUS-ACK) in response to successfully receiving a WUS. According to still other embodiments, the UE may abstain from sending feedback in case it has missed detection of WUS or has not received a WUS.

According to certain embodiments, the WUS-ACK by the UE may help the network node to save resources when the UE has missed a WUS. For example, the network node may infer or determine that the UE is not awake and therefore, not send any subsequent PDCCH(s). Instead, the network node may send a WUS again in the next WUS monitoring occasion. In some embodiments, the frequency of monitoring occasions is increased, thereby allowing the lowering of the latency when a WUS has been missed. Moreover, in a particular embodiment, even if the network node does not receive an ACK successfully or has received it because of a false alarm, it does not increase the resources used by the network node because the network node will simply abstain from sending a scheduling PDCCH.

According to certain embodiments, a WUS-ACK may lead to a slight power consumption at the UE for one transmission. However, it may reduce the number of lost packets caused by missing the detection of the WUS. Furthermore, in embodiments where frequent WUS monitoring occasions are configured for the UE, the UE may save energy by not having to monitor the rest of the monitoring occasions, if a WUS is detected in a previous one.

According to certain embodiments, whether the UE shall send ACK or not upon WUS detection may be controlled by the network node, for example, on a UE-basis. For example, for a UE within a certain range of the cell, the network node might want to invoke WUS-ACK reporting. According to certain embodiments, the configuration may include a conditional threshold as discussed above to be configured at the same time or an offset to the previously-described thresholds. For example, in particular embodiments, a UE perceiving a RSRP below such a threshold may start reporting WUS-ACKs. This may act as a warning to the network node that the UE is getting out of WUS coverage. In response, the network node may reconfigure WUS resources, in a particular embodiment.

One example implementation of the WUS-ACK feature includes sending the ACK over a Physical Uplink Control Channel (PUCCH) using, for example, PUCCH formats 0 or 1, in particular embodiments. The network node may pre-configure the UE to use specific resources for the ACK. For example, the network node may configure the UE to use certain resources that have a specific offset from the WUS monitoring occasion. As another example, the network node can send a more detailed WUS indicating such resources and offset if it uses PDCCH based WUS, for example.

Figure 4:
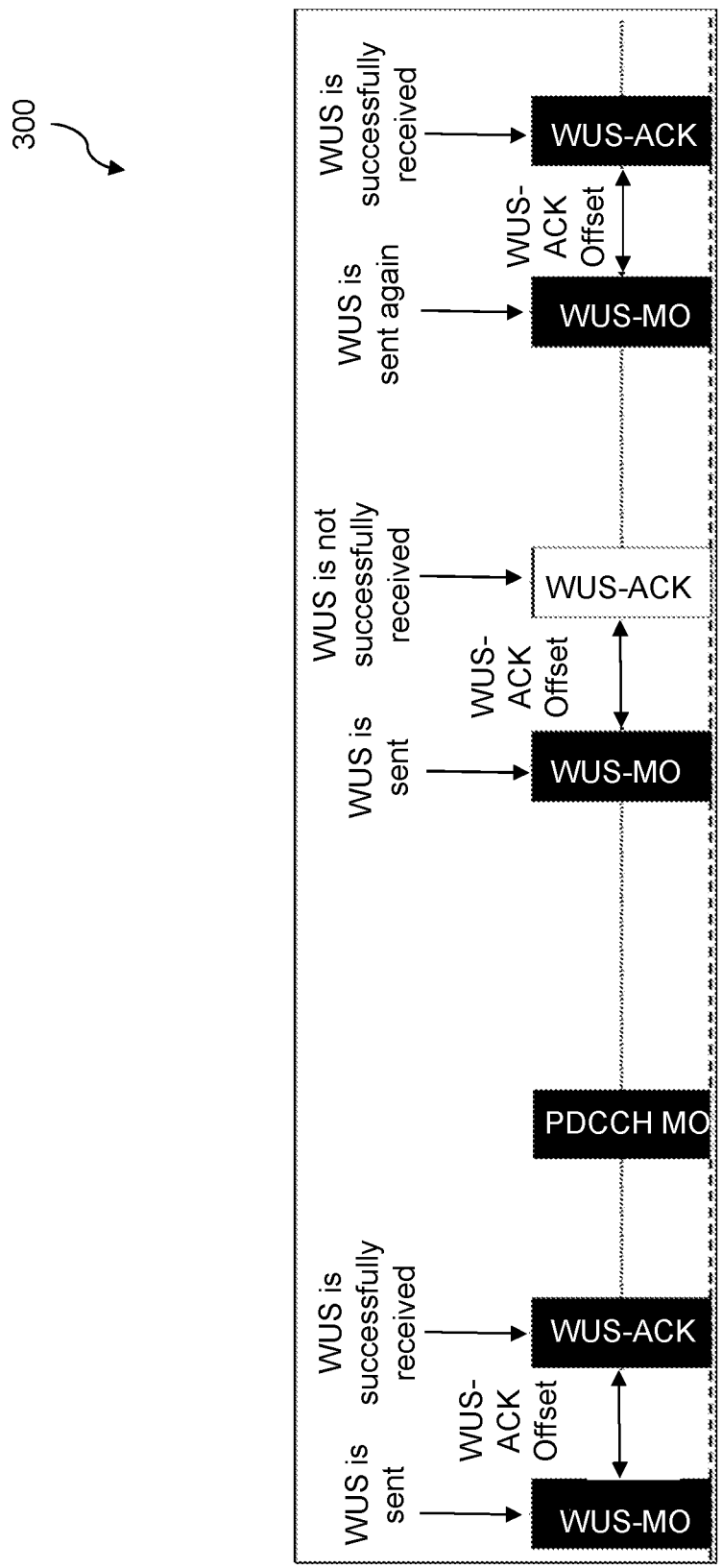
FIG. 4 illustrates an example of a WUS-acknowledgment (WUS-ACK) operation, according to certain embodiments.

FIG. 4 illustrates an example of a WUS-ACK operation, according to certain embodiments.

According to certain embodiments, a network node-configured parameter may be introduced in order to let the network more confidently configure a low aggregation level without risking losing the UE in cases it moves out of coverage of the WUS. For example, the network node-configured parameter may include a timer or a counter counting N number of successive WUS occasions, in certain particular embodiments. According to certain embodiments, after N WUS monitoring occasions, regardless of WUS presence was detected or not by the UE, the UE may exit the WUS monitoring state and fall back to a regular PDCCH monitoring CORESET, assumedly with higher aggregation level. As a result, the network node may have more leeway to configure the UE with a low aggregation level if the UE is configured with the fall-back mechanism if it moves out of WUS coverage.

According to certain embodiments, an indication may be sent from the UE to the network node, indicating that the UE has left the WUS monitoring state. This may prevent the network node from wasting resources on sending WUSs that would not be decoded by the UE. In a particular embodiment, the indication may include channel conditions reports. Based on such reports, if the quality is good enough, the network node may command the UE to return to the WUS monitoring state. For example, in a particular embodiment, the network node may command the UE to return to the WUS monitoring state with a different timer or counter value N', where N' is greater than N if the reported quality is very high. In some embodiments, N could be set to zero meaning that timer is disabled.

Figure 5:
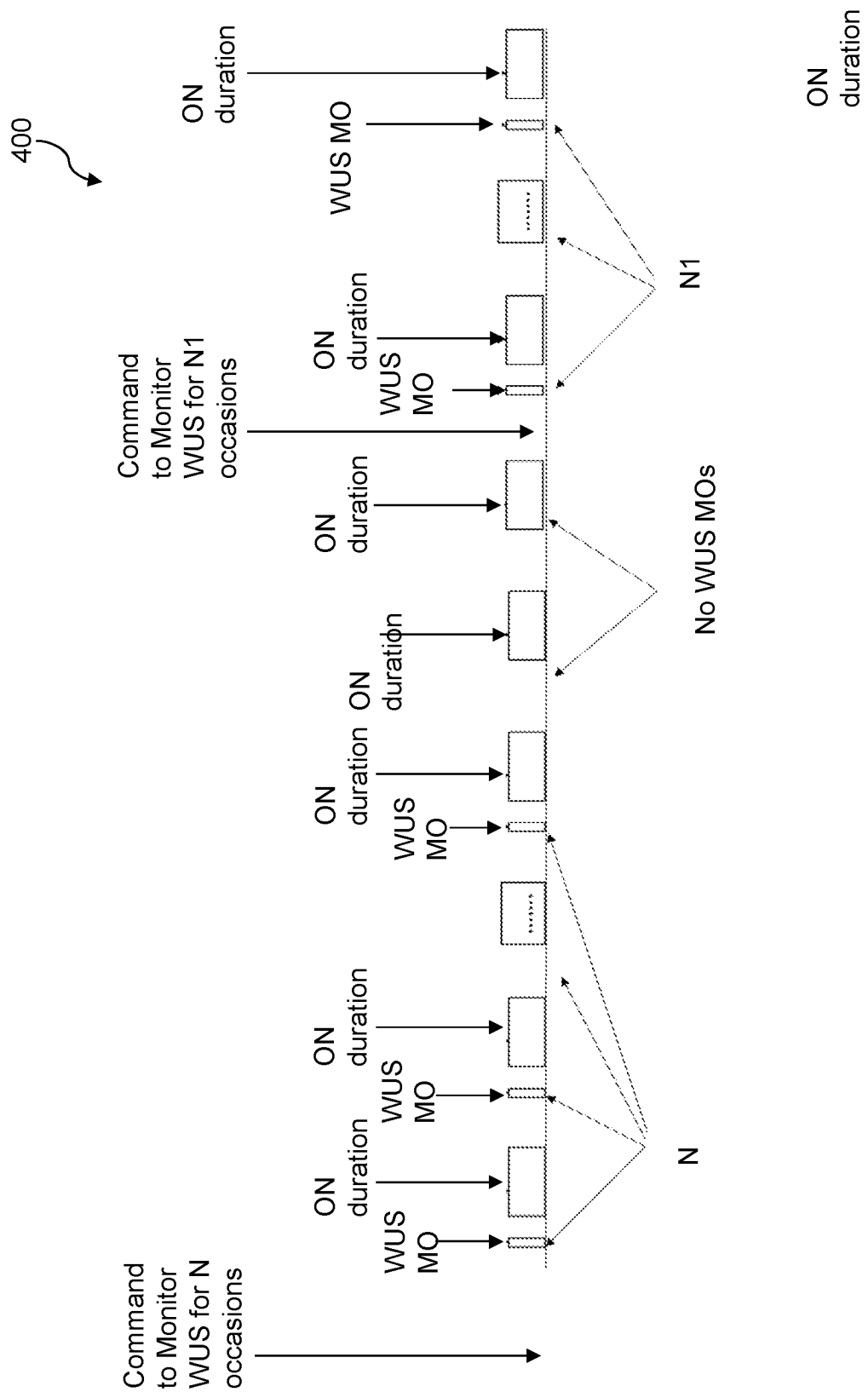
FIG. 5 illustrates an example case of WUS monitoring based on N occasions, according to certain embodiments.

FIG. 5 illustrates an example case of WUS monitoring based on N occasions, according to certain embodiments. More specifically, FIG. 5 illustrates an example where the command to monitor WUS includes a timer value N, which tells the UE to monitor WUS in N WUS monitoring occasions. Subsequently, the UE may not monitor WUS until it gets another command to monitor WUS with potential new WUS configuration and a timer value.

According to certain other embodiments, the UE may be configured with a first timer value N and a second timer value M. The UE may monitor for a WUS in only M out of N possible WUS occasions (e.g., in a duty cycle for WUS monitoring). Accordingly, the network node may potentially always reach the UE. For example, even if UE fails to detect WUS in M occasions, the UE may be reachable in the N-M opportunities. Further, with this approach, the command need not be re-sent/updated every N cycles since network node can re-configure WUS to the UE on an as-needed basis. Such a configuration may also allow the network to configure dedicated WUS CORESETs, whereby the search spaces in these CORESETs are configured with lower aggregation levels. As a result, the network may schedule more WUSs to multiple UEs, thereby, increasing its scheduling flexibility while at the same time allowing for a fall-back mechanism for handling UEs in bad coverage areas.

According to certain embodiments, the regular PDCCH monitoring CORESET may have multiple search spaces that include search spaces configured for higher aggregation levels. Such a search space may ensure that a UE in bad coverage area is still reachable.

According to certain embodiments, a WUS decoder metric may be used to determine PDCCH monitoring.

In certain embodiments described above, the estimated channel quality (or other conditions) for the network node-UE link may be used to trigger PDCCH monitoring even if a WUS is not detected. This may prevent performance degradation when a transmitted WUS is not successfully decoded by the UE. However, this may also result in unnecessary PDCCH monitoring and energy consumption by the UE. However, according to certain embodiments, the latter may be reduced by utilizing internal decoder metrics from the UE's channel decoder. In contrast to the RSRP or other quality metrics, these embodiments may determine the PDCCH monitoring decision according to the instantaneous effective channel quality, instead of an average quality.

In certain embodiments, the UE uses its control channel decoder to obtain a soft metric characterizing the convergence to a received valid codeword. The decoder metric may be a S-metric in a soft Viterbi decoder, a mean extrinsic information magnitude in a Turbo decoder, another soft value quality metrics in a LDPC decoder, message reliabilities in a message-passing Polar decoder, a path metric in Polar list decoding, etc. If the input signal to the decoder is not a valid codeword, the decoder metric value does not typically increase significantly during an iterative or sequential decoding process, whereas in the presence of a valid codeword, a metric increase may be observed in scenarios of interest. If the coded bits' quality is insufficient for decoding, the increase of the decoder metric saturates at some level, e.g., depending on the received symbol SNR, while successful decoding is accompanied by the decoder metric reaching high values.

Recognizing a likely PDCCH decoding that was unsuccessful may thus be achieved by detecting that the decoder metric exceeds and remains above a threshold at some point in the decoding process. If the decoding was unsuccessful, it is not possible to ascertain the C-RNTI used to scramble the CRC of the PDCCH or its contents, and thus to determine whether the WUS or another PDCCH in the predetermined resources was directed to the given UE. However, detecting that a WUS-compatible PDCCH format was likely transmitted allows more reliable triggering of scheduling PDCCH monitoring, while avoiding PDCCH monitoring when no WUS-compatible PDCCH was transmitted.

According to certain embodiments, the decoder metric may be a demodulator output metric such as, for example, the soft value distribution at the demodulator output, indicating a likely presence of QPSK symbols in the relevant REs in the WUS-PDCCH search space. While the RE contents may not be determined, the metric allows avoiding PDCCH monitoring if no QPSK signal contents were present in the search space.

According to certain embodiments, the UE may perform PDCCH monitoring if a WUS is successfully detected or if the decoder metric is above a predetermined threshold, indicating that a WUS may have been sent but the channel conditions have not permitted proper decoding. If the metric is below the threshold, indicating a lack of WUS transmission, no PDCCH monitoring is performed during the following period. In a particular embodiment, if the WUS SS contains multiple WUS-PDCCH formats or T/F locations, the largest of all performed tentative decoding metrics is used. In a particular embodiment, the threshold may be determined based on numerical evaluations made offline and stored, and the threshold value may a function of a channel quality metric such as, for example, a metric described above in the second set of embodiments. Alternatively, in a particular embodiment, the threshold may be based on UE's online statistics about the decoder metric values encountered during WUS decoding, such as the decoder metric values for instances of successful decoding and decoding failures.

According to certain embodiments, the decoder metric may be combined with a channel quality metric to provide the conditional WUS operation. For example, when the channel quality metric is below a threshold, monitoring is performed regardless of the decoder metric result. But if the decoder metric result may be used if channel quality metric is above a threshold to determine when to perform monitoring. Furthermore, several types of metrics (decoder output metric, demodulator output metric, average channel quality metric, etc.) may be combined to determine the monitoring decision. Different combinations of metrics and thresholds may be used at different channel quality conditions.

According to certain embodiments, the network node may have control over activating the use of decoder metric. The UE may indicate the capability or request the use of the feature and the network node may configure the UE to use it and/or specify signal quality, decoder metric, and other parameter value thresholds for the PDCCH monitoring decision.

Figure 6:
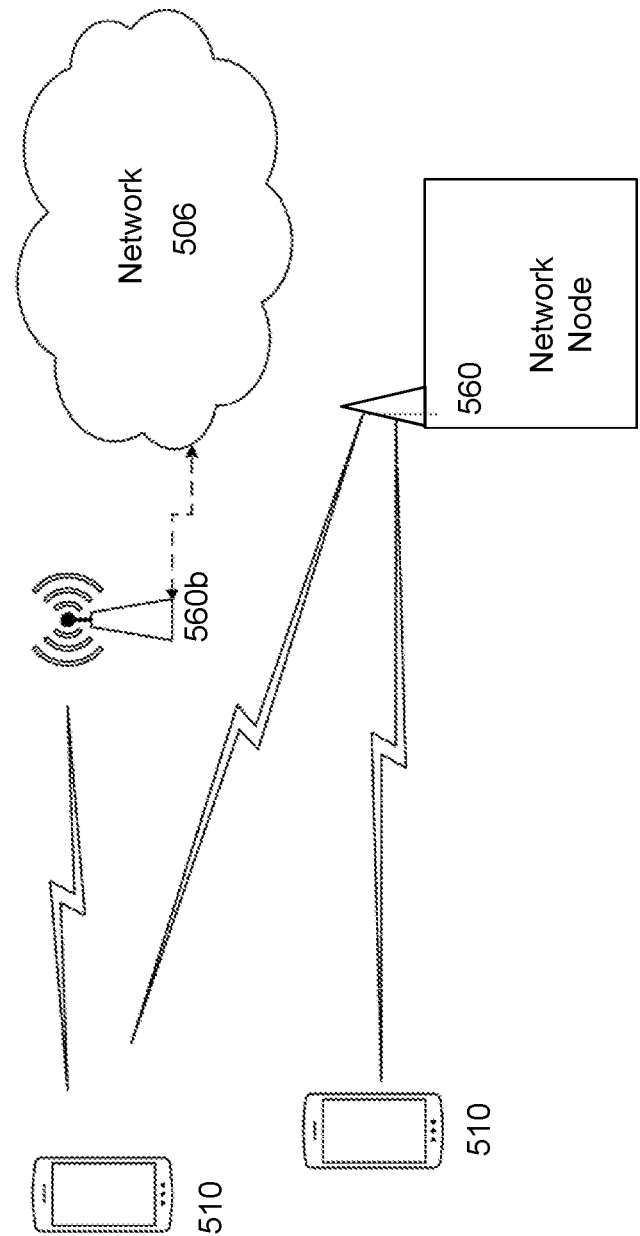
FIG. 6 illustrates an example wireless network, according to certain embodiments.

Although the subject matter described herein may be implemented in any appropriate type of system using any suitable components, the embodiments disclosed herein are described in relation to a wireless network. FIG. 6 illustrates an example wireless network, according to certain embodiments. For simplicity, the wireless network of FIG. 6 only depicts network 506, network nodes 560 and 560b, and WDs 510, 510b, and 510c. In practice, a wireless network may further include any additional elements suitable to support communication between wireless devices or between a wireless device and another communication device, such as a landline telephone, a service provider, or any other network node or end device. Of the illustrated components, network node 560 and wireless device 510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 560 and wireless device 510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 7:
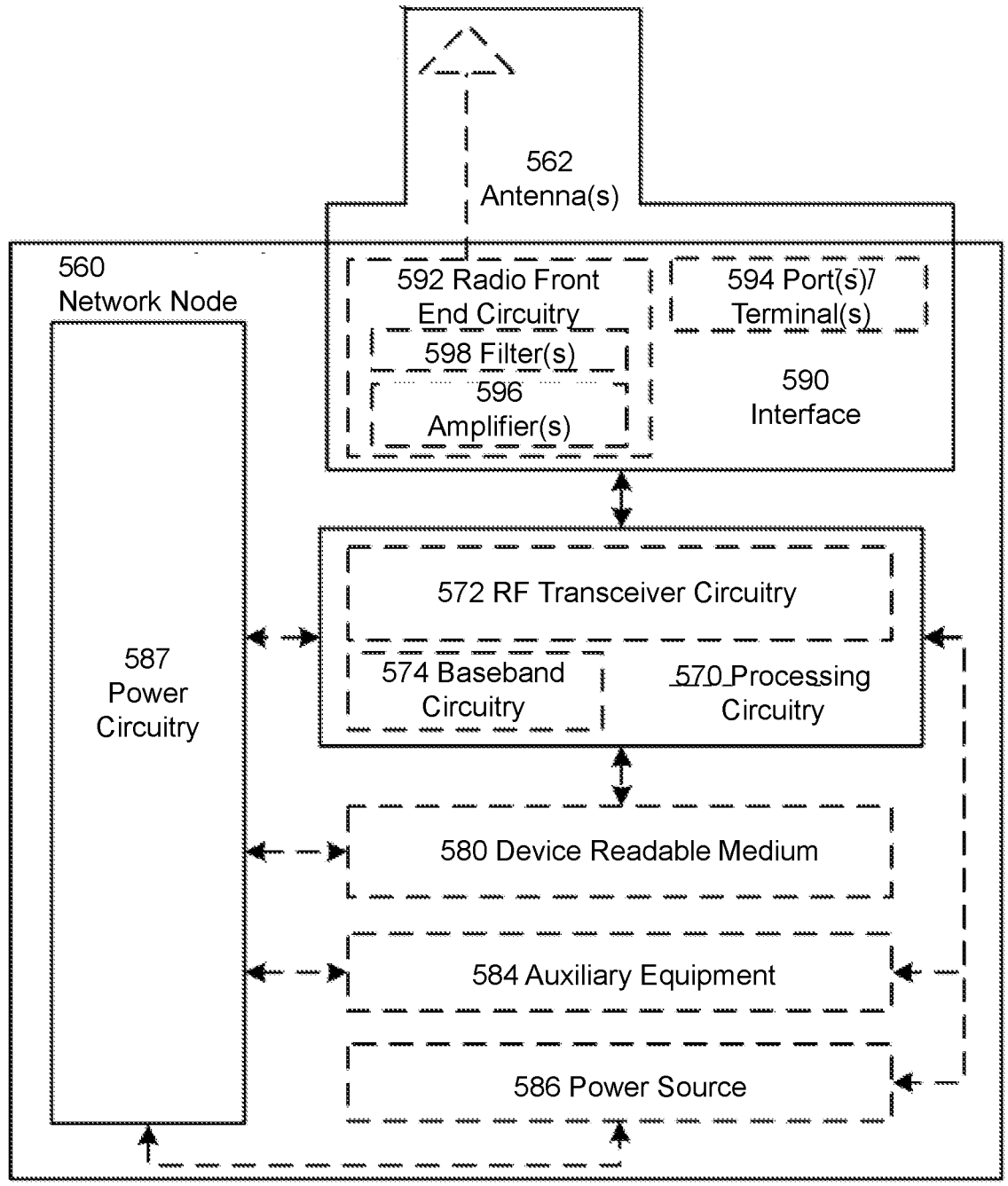
FIG. 7 illustrates an example network node, according to certain embodiments.

FIG. 7 illustrates an example network node 560, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 560 includes processing circuitry 570, device readable medium 580, interface 590, auxiliary equipment 584, power source 586, power circuitry 587, and antenna 562. Although network node 560 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 560 are depicted as single boxes located within a larger box, or nested within multiple boxes, in practice, a network node may comprise multiple different physical components that make up a single illustrated component (e.g., device readable medium 580 may comprise multiple separate hard drives as well as multiple RAM modules).

Similarly, network node 560 may be composed of multiple physically separate components (e.g., a NodeB component and a RNC component, or a BTS component and a BSC component, etc.), which may each have their own respective components. In certain scenarios in which network node 560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 560 may be configured to support multiple radio access technologies (RATs). In such embodiments, some components may be duplicated (e.g., separate device readable medium 580 for the different RATs) and some components may be reused (e.g., the same antenna 562 may be shared by the RATs). Network node 560 may also include multiple sets of the various illustrated components for different wireless technologies integrated into network node 560, such as, for example, GSM, WCDMA, LTE, NR, WiFi, or Bluetooth wireless technologies. These wireless technologies may be integrated into the same or different chip or set of chips and other components within network node 560.

Processing circuitry 570 is configured to perform any determining, calculating, or similar operations (e.g., certain obtaining operations) described herein as being provided by a network node. These operations performed by processing circuitry 570 may include processing information obtained by processing circuitry 570 by, for example, converting the obtained information into other information, comparing the obtained information or converted information to information stored in the network node, and/or performing one or more operations based on the obtained information or converted information, and as a result of said processing making a determination.

Processing circuitry 570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 560 components, such as device readable medium 580, network node 560 functionality. For example, processing circuitry 570 may execute instructions stored in device readable medium 580 or in memory within processing circuitry 570. Such functionality may include providing any of the various wireless features, functions, or benefits discussed herein. In some embodiments, processing circuitry 570 may include a system on a chip (SOC).

In some embodiments, processing circuitry 570 may include one or more of radio frequency (RF) transceiver circuitry 572 and baseband processing circuitry 574. In some embodiments, radio frequency (RF) transceiver circuitry 572 and baseband processing circuitry 574 may be on separate chips (or sets of chips), boards, or units, such as radio units and digital units. In alternative embodiments, part or all of RF transceiver circuitry 572 and baseband processing circuitry 574 may be on the same chip or set of chips, boards, or units In certain embodiments, some or all of the functionality described herein as being provided by a network node, base station, eNB or other such network device may be performed by processing circuitry 570 executing instructions stored on device readable medium 580 or memory within processing circuitry 570. In alternative embodiments, some or all of the functionality may be provided by processing circuitry 570 without executing instructions stored on a separate or discrete device readable medium, such as in a hard-wired manner. In any of those embodiments, whether executing instructions stored on a device readable storage medium or not, processing circuitry 570 can be configured to perform the described functionality. The benefits provided by such functionality are not limited to processing circuitry 570 alone or to other components of network node 560 but are enjoyed by network node 560 as a whole, and/or by end users and the wireless network generally.

Device readable medium 580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 570. Device readable medium 580 may store any suitable instructions, data or information, including a computer program, software, an application including one or more of logic, rules, code, tables, etc. and/or other instructions capable of being executed by processing circuitry 570 and, utilized by network node 560. Device readable medium 580 may be used to store any calculations made by processing circuitry 570 and/or any data received via interface 590. In some embodiments, processing circuitry 570 and device readable medium 580 may be considered to be integrated.

Interface 590 is used in the wired or wireless communication of signalling and/or data between network node 560, network 506, and/or WDs 510. As illustrated, interface 590 comprises port(s)/terminal(s) 594 to send and receive data, for example to and from network 506 over a wired connection. Interface 590 also includes radio front end circuitry 592 that may be coupled to, or in certain embodiments a part of, antenna 562. Radio front end circuitry 592 comprises filters 598 and amplifiers 596. Radio front end circuitry 592 may be connected to antenna 562 and processing circuitry 570. Radio front end circuitry may be configured to condition signals communicated between antenna 562 and processing circuitry 570. Radio front end circuitry 592 may receive digital data that is to be sent out to other network nodes or WDs via a wireless connection. Radio front end circuitry 592 may convert the digital data into a radio signal having the appropriate channel and bandwidth parameters using a combination of filters 598 and/or amplifiers 596. The radio signal may then be transmitted via antenna 562. Similarly, when receiving data, antenna 562 may collect radio signals which are then converted into digital data by radio front end circuitry 592. The digital data may be passed to processing circuitry 570. In other embodiments, the interface may comprise different components and/or different combinations of components.

In certain alternative embodiments, network node 560 may not include separate radio front end circuitry 592, instead, processing circuitry 570 may comprise radio front end circuitry and may be connected to antenna 562 without separate radio front end circuitry 592. Similarly, in some embodiments, all or some of RF transceiver circuitry 572 may be considered a part of interface 590. In still other embodiments, interface 590 may include one or more ports or terminals 594, radio front end circuitry 592, and RF transceiver circuitry 572, as part of a radio unit (not shown), and interface 590 may communicate with baseband processing circuitry 574, which is part of a digital unit (not shown).

Antenna 562 may include one or more antennas, or antenna arrays, configured to send and/or receive wireless signals. Antenna 562 may be coupled to radio front end circuitry 590 and may be any type of antenna capable of transmitting and receiving data and/or signals wirelessly. In some embodiments, antenna 562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 562 may be separate from network node 560 and may be connectable to network node 560 through an interface or port.

Antenna 562, interface 590, and/or processing circuitry 570 may be configured to perform any receiving operations and/or certain obtaining operations described herein as being performed by a network node. Any information, data and/or signals may be received from a wireless device, another network node and/or any other network equipment. Similarly, antenna 562, interface 590, and/or processing circuitry 570 may be configured to perform any transmitting operations described herein as being performed by a network node. Any information, data and/or signals may be transmitted to a wireless device, another network node and/or any other network equipment.

Power circuitry 587 may comprise, or be coupled to, power management circuitry and is configured to supply the components of network node 560 with power for performing the functionality described herein. Power circuitry 587 may receive power from power source 586. Power source 586 and/or power circuitry 587 may be configured to provide power to the various components of network node 560 in a form suitable for the respective components (e.g., at a voltage and current level needed for each respective component). Power source 586 may either be included in, or external to, power circuitry 587 and/or network node 560. For example, network node 560 may be connectable to an external power source (e.g., an electricity outlet) via an input circuitry or interface such as an electrical cable, whereby the external power source supplies power to power circuitry 587. As a further example, power source 586 may comprise a source of power in the form of a battery or battery pack which is connected to, or integrated in, power circuitry 587. The battery may provide backup power should the external power source fail. Other types of power sources, such as photovoltaic devices, may also be used.

Alternative embodiments of network node 560 may include additional components beyond those shown in FIG. 7 that may be responsible for providing certain aspects of the network node's functionality, including any of the functionality described herein and/or any functionality necessary to support the subject matter described herein. For example, network node 560 may include user interface equipment to allow input of information into network node 560 and to allow output of information from network node 560. This may allow a user to perform diagnostic, maintenance, repair, and other administrative functions for network node 560.

Figure 8:
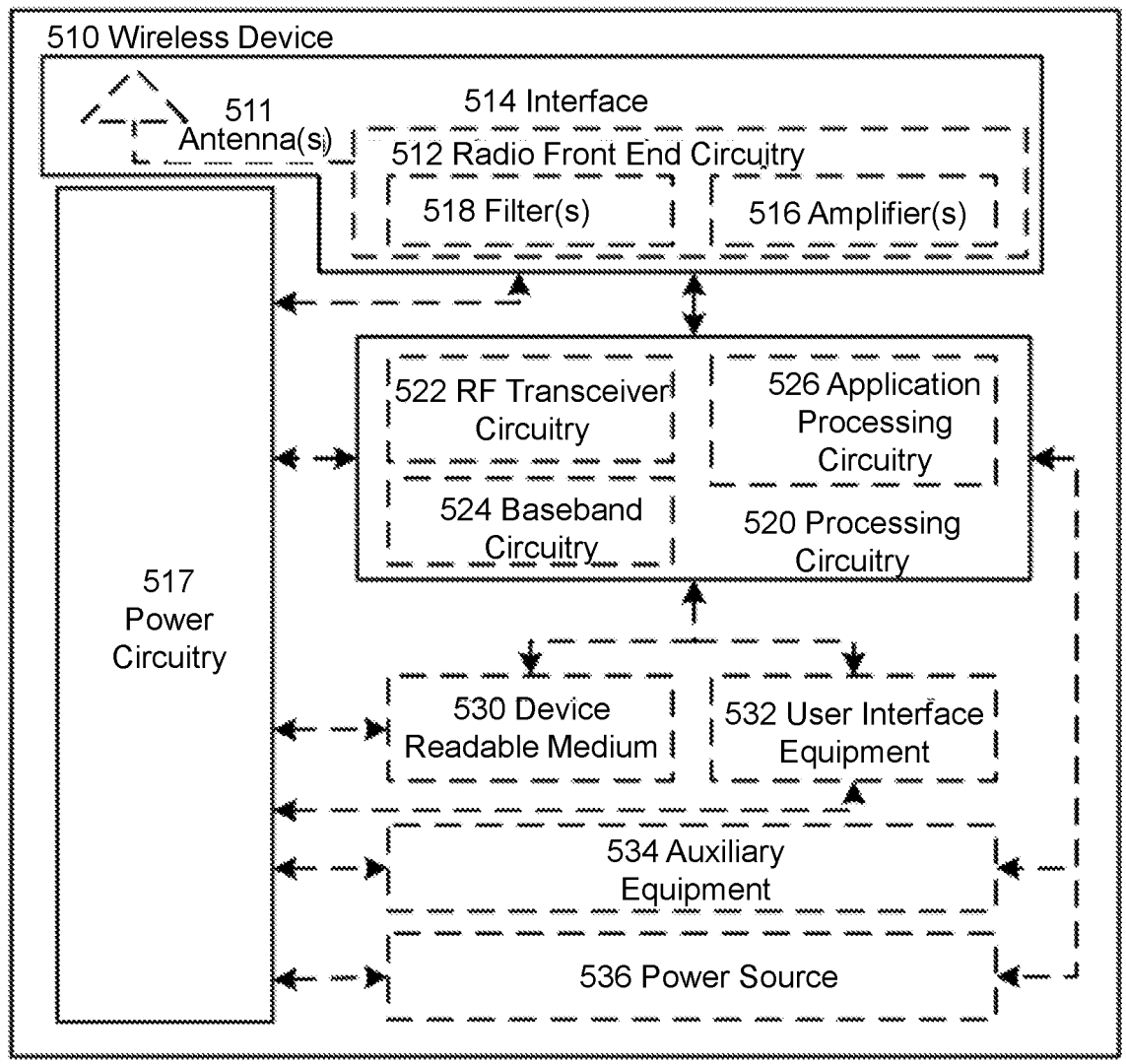
FIG. 8 illustrates an example wireless device, according to certain embodiments.

FIG. 8 illustrates an example wireless device, according to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 510 includes antenna 511, interface 514, processing circuitry 520, device readable medium 530, user interface equipment 532, auxiliary equipment 534, power source 536 and power circuitry 537. Wireless device 510 may include multiple sets of one or more of the illustrated components for different wireless technologies supported by wireless device 510, such as, for example, GSM, WCDMA, LTE, NR, WIFI, WiMAX, or Bluetooth wireless technologies, just to mention a few. These wireless technologies may be integrated into the same or different chips or set of chips as other components within wireless device 510.

Antenna 511 may include one or more antennas or antenna arrays, configured to send and/or receive wireless signals, and is connected to interface 514. In certain alternative embodiments, antenna 511 may be separate from wireless device 510 and be connectable to wireless device 510 through an interface or port. Antenna 511, interface 514, and/or processing circuitry 520 may be configured to perform any receiving or transmitting operations described herein as being performed by a WD. Any information, data and/or signals may be received from a network node and/or another WD. In some embodiments, radio front end circuitry and/or antenna 511 may be considered an interface.

As illustrated, interface 514 comprises radio front end circuitry 512 and antenna 511. Radio front end circuitry 512 comprise one or more filters 518 and amplifiers 516. Radio front end circuitry 514 is connected to antenna 511 and processing circuitry 520 and is configured to condition signals communicated between antenna 511 and processing circuitry 520. Radio front end circuitry 512 may be coupled to or a part of antenna 511. In some embodiments, wireless device 510 may not include separate radio front end circuitry 512; rather, processing circuitry 520 may comprise radio front end circuitry and may be connected to antenna 511. Similarly, in some embodiments, some or all of RF transceiver circuitry 522 may be considered a part of interface 514. Radio front end circuitry 512 may receive digital data that is to be sent out to other network nodes or WDs via a wireless connection. Radio front end circuitry 512 may convert the digital data into a radio signal having the appropriate channel and bandwidth parameters using a combination of filters 518 and/or amplifiers 516. The radio signal may then be transmitted via antenna 511. Similarly, when receiving data, antenna 511 may collect radio signals which are then converted into digital data by radio front end circuitry 512. The digital data may be passed to processing circuitry 520. In other embodiments, the interface may comprise different components and/or different combinations of components.

Processing circuitry 520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 510 components, such as device readable medium 530, wireless device 510 functionality. Such functionality may include providing any of the various wireless features or benefits discussed herein. For example, processing circuitry 520 may execute instructions stored in device readable medium 530 or in memory within processing circuitry 520 to provide the functionality disclosed herein.

As illustrated, processing circuitry 520 includes one or more of RF transceiver circuitry 522, baseband processing circuitry 524, and application processing circuitry 526. In other embodiments, the processing circuitry may comprise different components and/or different combinations of components. In certain embodiments processing circuitry 520 of wireless device 510 may comprise a SOC. In some embodiments, RF transceiver circuitry 522, baseband processing circuitry 524, and application processing circuitry 526 may be on separate chips or sets of chips. In alternative embodiments, part or all of baseband processing circuitry 524 and application processing circuitry 526 may be combined into one chip or set of chips, and RF transceiver circuitry 522 may be on a separate chip or set of chips. In still alternative embodiments, part or all of RF transceiver circuitry 522 and baseband processing circuitry 524 may be on the same chip or set of chips, and application processing circuitry 526 may be on a separate chip or set of chips. In yet other alternative embodiments, part or all of RF transceiver circuitry 522, baseband processing circuitry 524, and application processing circuitry 526 may be combined in the same chip or set of chips. In some embodiments, RF transceiver circuitry 522 may be a part of interface 514. RF transceiver circuitry 522 may condition RF signals for processing circuitry 520.

In certain embodiments, some or all of the functionality described herein as being performed by a wireless device may be provided by processing circuitry 520 executing instructions stored on device readable medium 530, which in certain embodiments may be a computer-readable storage medium. In alternative embodiments, some or all of the functionality may be provided by processing circuitry 520 without executing instructions stored on a separate or discrete device readable storage medium, such as in a hard-wired manner. In any of those particular embodiments, whether executing instructions stored on a device readable storage medium or not, processing circuitry 520 can be configured to perform the described functionality. The benefits provided by such functionality are not limited to processing circuitry 520 alone or to other components of wireless device 510 but are enjoyed by wireless device 510 as a whole, and/or by end users and the wireless network generally.

Processing circuitry 520 may be configured to perform any determining, calculating, or similar operations (e.g., certain obtaining operations) described herein as being performed by a WD. These operations, as performed by processing circuitry 520, may include processing information obtained by processing circuitry 520 by, for example, converting the obtained information into other information, comparing the obtained information or converted information to information stored by wireless device 510, and/or performing one or more operations based on the obtained information or converted information, and as a result of said processing making a determination.

Device readable medium 530 may be operable to store a computer program, software, an application including one or more of logic, rules, code, tables, etc. and/or other instructions capable of being executed by processing circuitry 520. Device readable medium 530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 520. In some embodiments, processing circuitry 520 and device readable medium 530 may be considered to be integrated.

User interface equipment 532 may provide components that allow for a human user to interact with wireless device 510. Such interaction may be of many forms, such as visual, audial, tactile, etc. User interface equipment 532 may be operable to produce output to the user and to allow the user to provide input to wireless device 510. The type of interaction may vary depending on the type of user interface equipment 532 installed in wireless device 510. For example, if wireless device 510 is a smart phone, the interaction may be via a touch screen; if wireless device 510 is a smart meter, the interaction may be through a screen that provides usage (e.g., the number of gallons used) or a speaker that provides an audible alert (e.g., if smoke is detected). User interface equipment 532 may include input interfaces, devices and circuits, and output interfaces, devices and circuits. User interface equipment 532 is configured to allow input of information into wireless device 510 and is connected to processing circuitry 520 to allow processing circuitry 520 to process the input information. User interface equipment 532 may include, for example, a microphone, a proximity or other sensor, keys/buttons, a touch display, one or more cameras, a USB port, or other input circuitry. User interface equipment 532 is also configured to allow output of information from wireless device 510, and to allow processing circuitry 520 to output information from wireless device 510. User interface equipment 532 may include, for example, a speaker, a display, vibrating circuitry, a USB port, a headphone interface, or other output circuitry. Using one or more input and output interfaces, devices, and circuits, of user interface equipment 532, wireless device 510 may communicate with end users and/or the wireless network and allow them to benefit from the functionality described herein.

Auxiliary equipment 534 is operable to provide more specific functionality which may not be generally performed by WDs. This may comprise specialized sensors for doing measurements for various purposes, interfaces for additional types of communication such as wired communications etc. The inclusion and type of components of auxiliary equipment 534 may vary depending on the embodiment and/or scenario.

Power source 536 may, in some embodiments, be in the form of a battery or battery pack. Other types of power sources, such as an external power source (e.g., an electricity outlet), photovoltaic devices or power cells, may also be used. Wireless device 510 may further comprise power circuitry 537 for delivering power from power source 536 to the various parts of wireless device 510 which need power from power source 536 to carry out any functionality described or indicated herein. Power circuitry 537 may in certain embodiments comprise power management circuitry. Power circuitry 537 may additionally or alternatively be operable to receive power from an external power source; in which case wireless device 510 may be connectable to the external power source (such as an electricity outlet) via input circuitry or an interface such as an electrical power cable. Power circuitry 537 may also in certain embodiments be operable to deliver power from an external power source to power source 536. This may be, for example, for the charging of power source 536. Power circuitry 537 may perform any formatting, converting, or other modification to the power from power source 536 to make the power suitable for the respective components of wireless device 510 to which power is supplied.

Figure 9:
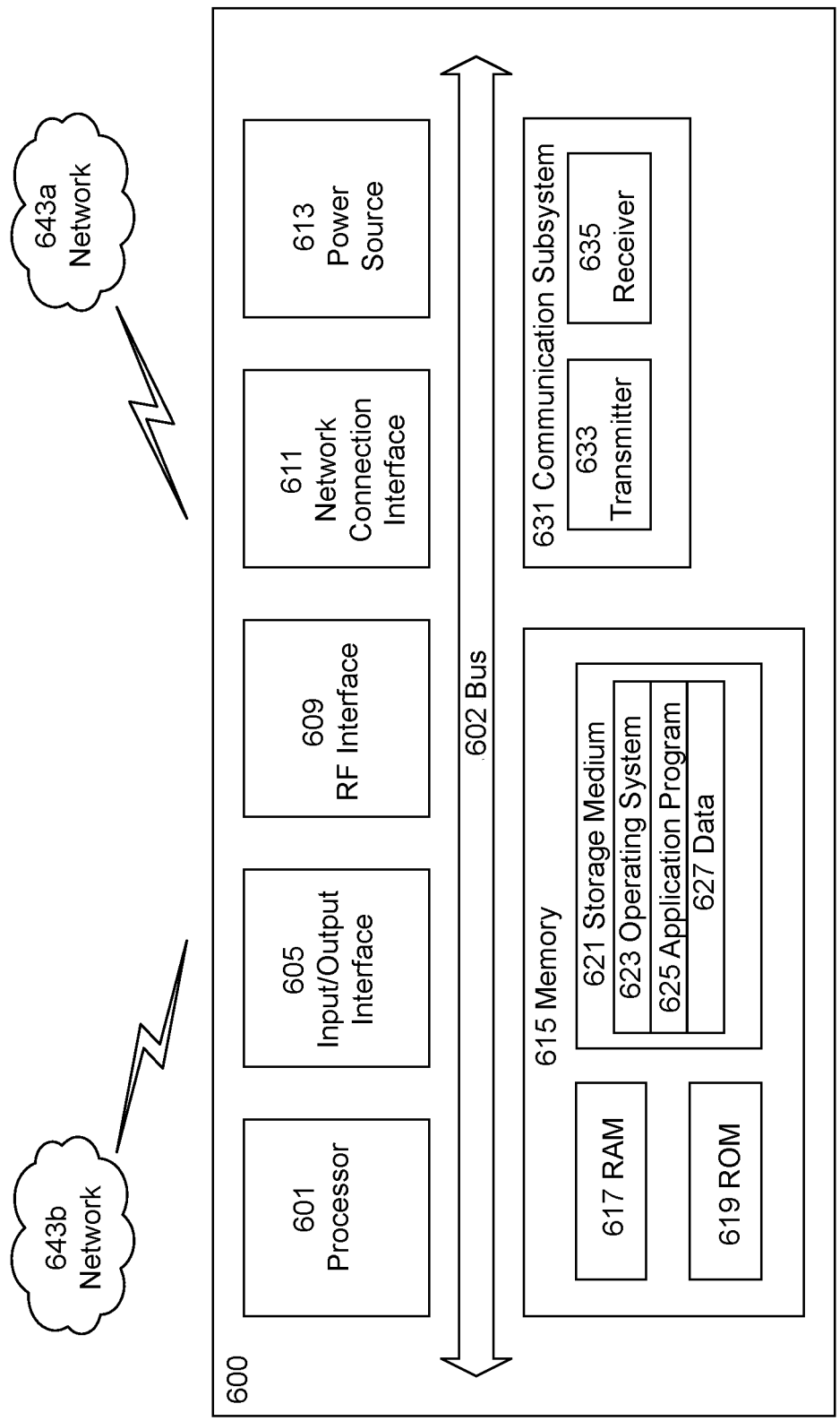
FIG. 9 illustrate an example user equipment, according to certain embodiments.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 6200 may be any UE identified by the $3^{rd}$ Generation Partnership Project (3GPP), including a NB-IoT UE, a machine type communication (MTC) UE, and/or an enhanced MTC (eMTC) UE. UE 600, as illustrated in FIG. 9, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 9 is a UE, the components discussed herein are equally applicable to a WD, and vice-versa.

In FIG. 9, UE 600 includes processing circuitry 601 that is operatively coupled to input/output interface 605, radio frequency (RF) interface 609, network connection interface 611, memory 615 including random access memory (RAM) 617, read-only memory (ROM) 619, and storage medium 621 or the like, communication subsystem 631, power source 633, and/or any other component, or any combination thereof. Storage medium 621 includes operating system 623, application program 625, and data 627. In other embodiments, storage medium 621 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 601 may be configured to process computer instructions and data. Processing circuitry 601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 601 may include two central processing units (CPUs). Data may be information in a form suitable for use by a computer.

In the depicted embodiment, input/output interface 605 may be configured to provide a communication interface to an input device, output device, or input and output device. UE 600 may be configured to use an output device via input/output interface 605. An output device may use the same type of interface port as an input device. For example, a USB port may be used to provide input to and output from UE 600. The output device may be a speaker, a sound card, a video card, a display, a monitor, a printer, an actuator, an emitter, a smartcard, another output device, or any combination thereof. UE 600 may be configured to use an input device via input/output interface 605 to allow a user to capture information into UE 600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 609 may be configured to provide a communication interface to RF components such as a transmitter, a receiver, and an antenna. Network connection interface 611 may be configured to provide a communication interface to network 643*a*. Network 643*a* may encompass wired and/or wireless networks such as a local-area network (LAN), a wide-area network (WAN), a computer network, a wireless network, a telecommunications network, another like network or any combination thereof. For example, network 643*a* may comprise a Wi-Fi network. Network connection interface 611 may be configured to include a receiver and a transmitter interface used to communicate with one or more other devices over a communication network according to one or more communication protocols, such as Ethernet, TCP/IP, SONET, ATM, or the like. Network connection interface 611 may implement receiver and transmitter functionality appropriate to the communication network links (e.g., optical, electrical, and the like). The transmitter and receiver functions may share circuit components, software or firmware, or alternatively may be implemented separately.

RAM 617 may be configured to interface via bus 602 to processing circuitry 601 to provide storage or caching of data or computer instructions during the execution of software programs such as the operating system, application programs, and device drivers. ROM 619 may be configured to provide computer instructions or data to processing circuitry 601. For example, ROM 619 may be configured to store invariant low-level system code or data for basic system functions such as basic input and output (I/O), startup, or reception of keystrokes from a keyboard that are stored in a non-volatile memory. Storage medium 621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 621 may be configured to include operating system 623, application program 625 such as a web browser application, a widget or gadget engine or another application, and data file 627. Storage medium 621 may store, for use by UE 600, any of a variety of various operating systems or combinations of operating systems.

Storage medium 621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 621 may allow UE 600 to access computer-executable instructions, application programs or the like, stored on transitory or non-transitory memory media, to off-load data, or to upload data. An article of manufacture, such as one utilizing a communication system may be tangibly embodied in storage medium 621, which may comprise a device readable medium.

In FIG. 9, processing circuitry 601 may be configured to communicate with network 643*b* using communication subsystem 631. Network 643*a* and network 643*b* may be the same network or networks or different network or networks. Communication subsystem 631 may be configured to include one or more transceivers used to communicate with network 643*b*. For example, communication subsystem 631 may be configured to include one or more transceivers used to communicate with one or more remote transceivers of another device capable of wireless communication such as another WD, UE, or base station of a radio access network (RAN) according to one or more communication protocols, such as IEEE 802.6, CDMA, WCDMA, GSM, LTE, UTRAN, WiMax, or the like. Each transceiver may include transmitter 633 and/or receiver 635 to implement transmitter or receiver functionality, respectively, appropriate to the RAN links (e.g., frequency allocations and the like). Further, transmitter 633 and receiver 635 of each transceiver may share circuit components, software or firmware, or alternatively may be implemented separately.

In the illustrated embodiment, the communication functions of communication subsystem 631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 631 may include cellular communication, Wi-Fi communication, Bluetooth communication, and GPS communication. Network 643*b* may encompass wired and/or wireless networks such as a local-area network (LAN), a wide-area network (WAN), a computer network, a wireless network, a telecommunications network, another like network or any combination thereof. For example, network 643*b* may be a cellular network, a Wi-Fi network, and/or a near-field network. Power source 613 may be configured to provide alternating current (AC) or direct current (DC) power to components of UE 600.

The features, benefits and/or functions described herein may be implemented in one of the components of UE 600 or partitioned across multiple components of UE 600. Further, the features, benefits, and/or functions described herein may be implemented in any combination of hardware, software or firmware. In one example, communication subsystem 631 may be configured to include any of the components described herein. Further, processing circuitry 601 may be configured to communicate with any of such components over bus 602. In another example, any of such components may be represented by program instructions stored in memory that when executed by processing circuitry 601 perform the corresponding functions described herein. In another example, the functionality of any of such components may be partitioned between processing circuitry 601 and communication subsystem 631. In another example, the non-computationally intensive functions of any of such components may be implemented in software or firmware and the computationally intensive functions may be implemented in hardware.

Figure 10:
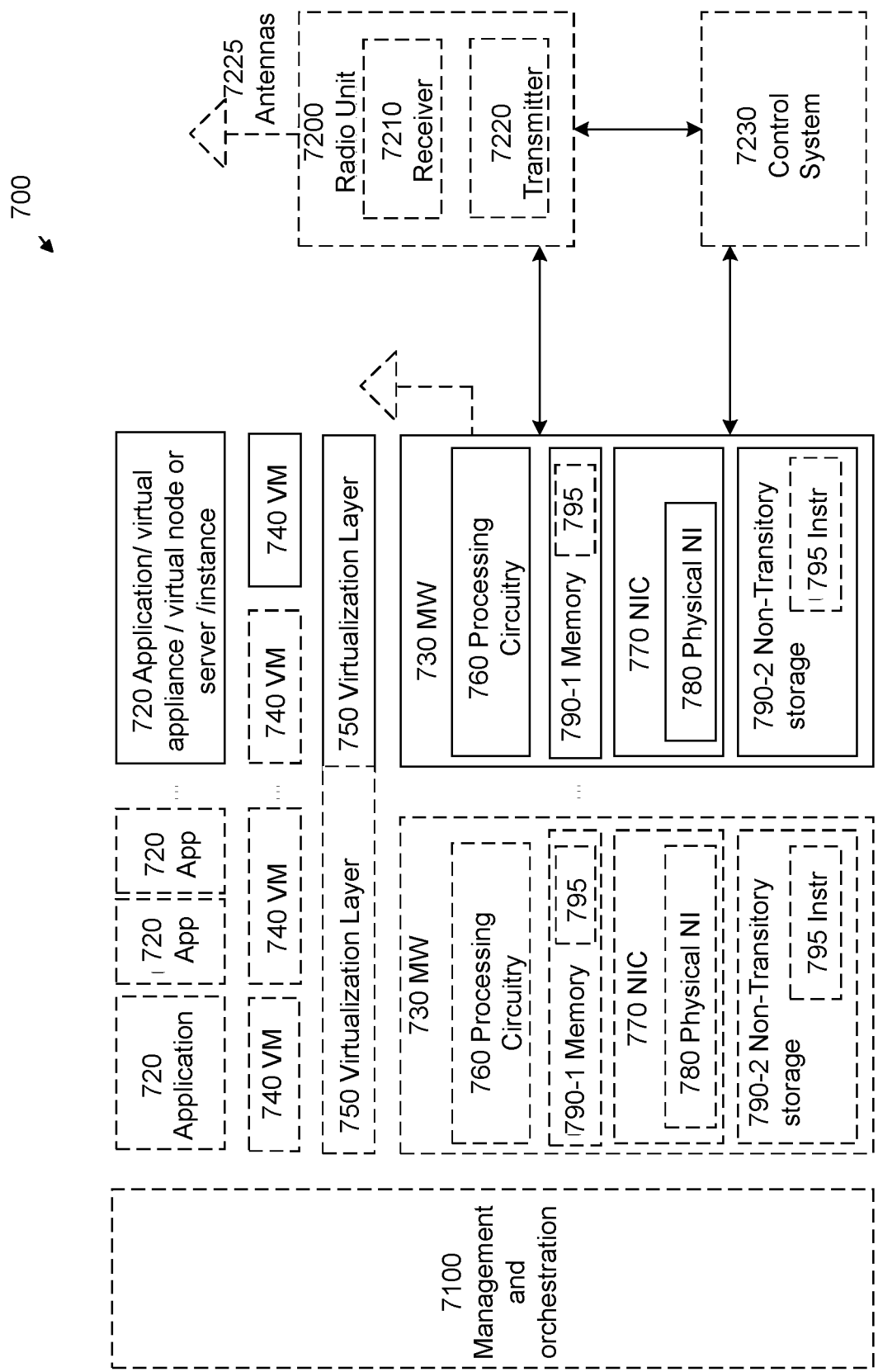
FIG. 10 illustrates a virtualization environment in which functions implemented by some embodiments may be virtualized, according to certain embodiments.

FIG. 10 is a schematic block diagram illustrating a virtualization environment 700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 700 hosted by one or more of hardware nodes 730. Further, in embodiments in which the virtual node is not a radio access node or does not require radio connectivity (e.g., a core network node), then the network node may be entirely virtualized.

The functions may be implemented by one or more applications 720 (which may alternatively be called software instances, virtual appliances, network functions, virtual nodes, virtual network functions, etc.) operative to implement some of the features, functions, and/or benefits of some of the embodiments disclosed herein. Applications 720 are run in virtualization environment 700 which provides hardware 730 comprising processing circuitry 760 and memory 790. Memory 790 contains instructions 795 executable by processing circuitry 760 whereby application 720 is operative to provide one or more of the features, benefits, and/or functions disclosed herein.

Virtualization environment 700, comprises general-purpose or special-purpose network hardware devices 730 comprising a set of one or more processors or processing circuitry 760, which may be commercial off-the-shelf (COTS) processors, dedicated Application Specific Integrated Circuits (ASICs), or any other type of processing circuitry including digital or analog hardware components or special purpose processors. Each hardware device may comprise memory 790-1 which may be non-persistent memory for temporarily storing instructions 795 or software executed by processing circuitry 760. Each hardware device may comprise one or more network interface controllers (NICs) 770, also known as network interface cards, which include physical network interface 780. Each hardware device may also include non-transitory, persistent, machine-readable storage media 790-2 having stored therein software 795 and/or instructions executable by processing circuitry 760. Software 795 may include any type of software including software for instantiating one or more virtualization layers 750 (also referred to as hypervisors), software to execute virtual machines 740 as well as software allowing it to execute functions, features and/or benefits described in relation with some embodiments described herein.

Virtual machines 740, comprise virtual processing, virtual memory, virtual networking or interface and virtual storage, and may be run by a corresponding virtualization layer 750 or hypervisor. Different embodiments of the instance of virtual appliance 720 may be implemented on one or more of virtual machines 740, and the implementations may be made in different ways.

During operation, processing circuitry 760 executes software 795 to instantiate the hypervisor or virtualization layer 750, which may sometimes be referred to as a virtual machine monitor (VMM). Virtualization layer 750 may present a virtual operating platform that appears like networking hardware to virtual machine 740.

As shown in FIG. 10, hardware 730 may be a standalone network node with generic or specific components. Hardware 730 may comprise antenna 7225 and may implement some functions via virtualization. Alternatively, hardware 730 may be part of a larger cluster of hardware (e.g. such as in a data center or customer premise equipment (CPE)) where many hardware nodes work together and are managed via management and orchestration (MANO) 7100, which, among others, oversees lifecycle management of applications 720.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 740 may be a software implementation of a physical machine that runs programs as if they were executing on a physical, non-virtualized machine. Each of virtual machines 740, and that part of hardware 730 that executes that virtual machine, be it hardware dedicated to that virtual machine and/or hardware shared by that virtual machine with others of the virtual machines 740, forms a separate virtual network elements (VNE).

Still in the context of NFV, Virtual Network Function (VNF) is responsible for handling specific network functions that run in one or more virtual machines 740 on top of hardware networking infrastructure 730 and corresponds to application 720 in FIG. 10.

In some embodiments, one or more radio units 7200 that each include one or more transmitters 7220 and one or more receivers 7210 may be coupled to one or more antennas 7225. Radio units 7200 may communicate directly with hardware nodes 730 via one or more appropriate network interfaces and may be used in combination with the virtual components to provide a virtual node with radio capabilities, such as a radio access node or a base station.

In some embodiments, some signalling can be affected with the use of control system 7230 which may alternatively be used for communication between the hardware nodes 730 and radio units 7200.

Figure 11:
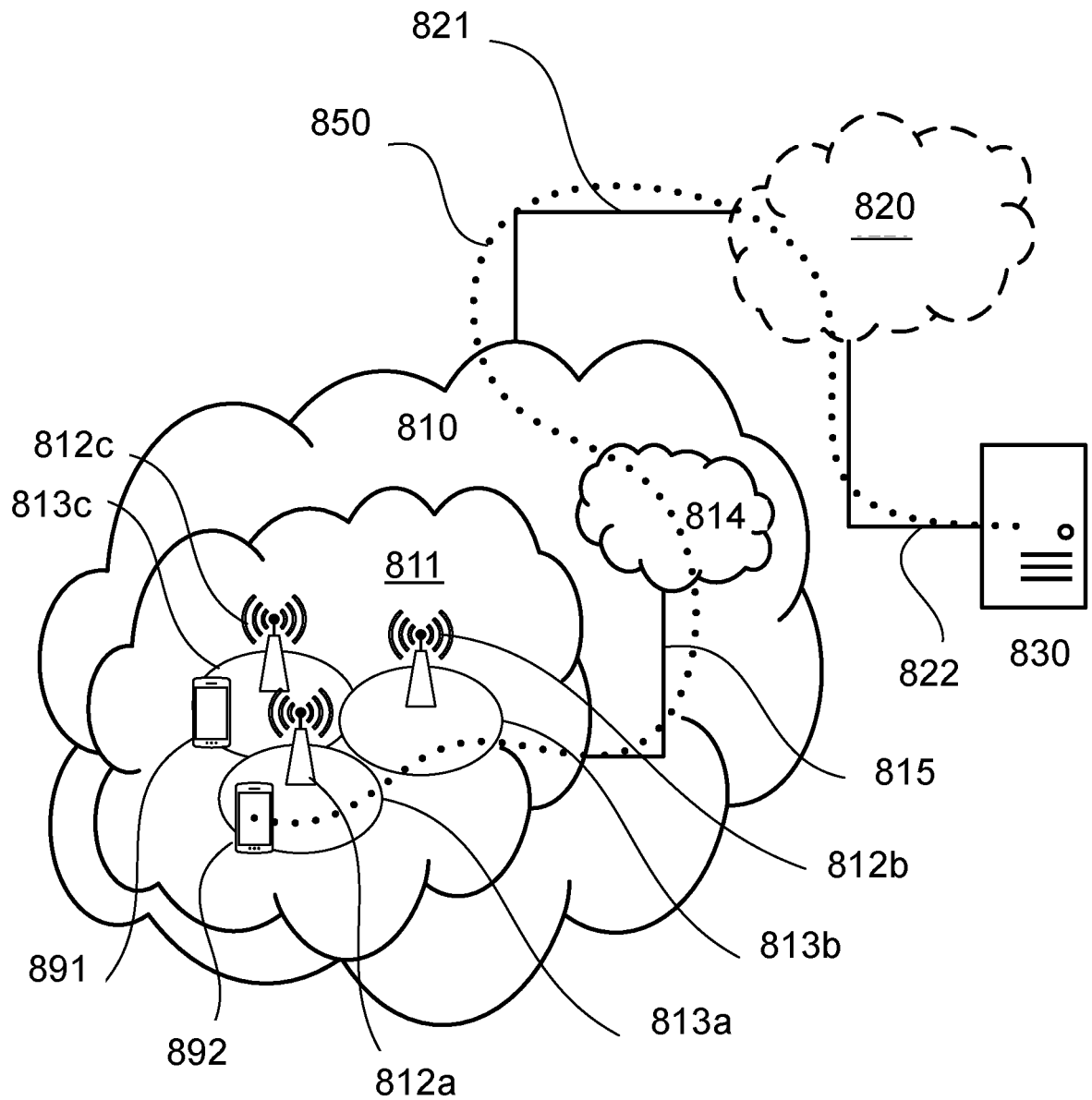
FIG. 11 illustrates a telecommunication network connected via an intermediate network to a host computer, according to certain embodiments.

FIG. 11 illustrates a telecommunication network connected via an intermediate network to a host computer, in accordance with some embodiments. With reference to FIG. 11, in accordance with an embodiment, a communication system includes telecommunication network 810, such as a 3GPP-type cellular network, which comprises access network 811, such as a radio access network, and core network 814. Access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to core network 814 over a wired or wireless connection 815. A first UE 891 located in coverage area 813*c* is configured to wirelessly connect to, or be paged by, the corresponding base station 812*c*. A second UE 892 in coverage area 813*a* is wirelessly connectable to the corresponding base station 812*a*. While a plurality of UEs 891, 892 are illustrated in this example, the disclosed embodiments are equally applicable to a situation where a sole UE is in the coverage area or where a sole UE is connecting to the corresponding base station 812.

Telecommunication network 810 is itself connected to host computer 830, which may be embodied in the hardware and/or software of a standalone server, a cloud-implemented server, a distributed server or as processing resources in a server farm. Host computer 830 may be under the ownership or control of a service provider, or may be operated by the service provider or on behalf of the service provider. Connections 821 and 822 between telecommunication network 810 and host computer 830 may extend directly from core network 814 to host computer 830 or may go via an optional intermediate network 820. Intermediate network 820 may be one of, or a combination of more than one of, a public, private or hosted network; intermediate network 820, if any, may be a backbone network or the Internet; in particular, intermediate network 820 may comprise two or more sub-networks (not shown).

The communication system of FIG. 11 as a whole enables connectivity between the connected UEs 891, 892 and host computer 830. The connectivity may be described as an over-the-top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink and downlink communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Figure 12:
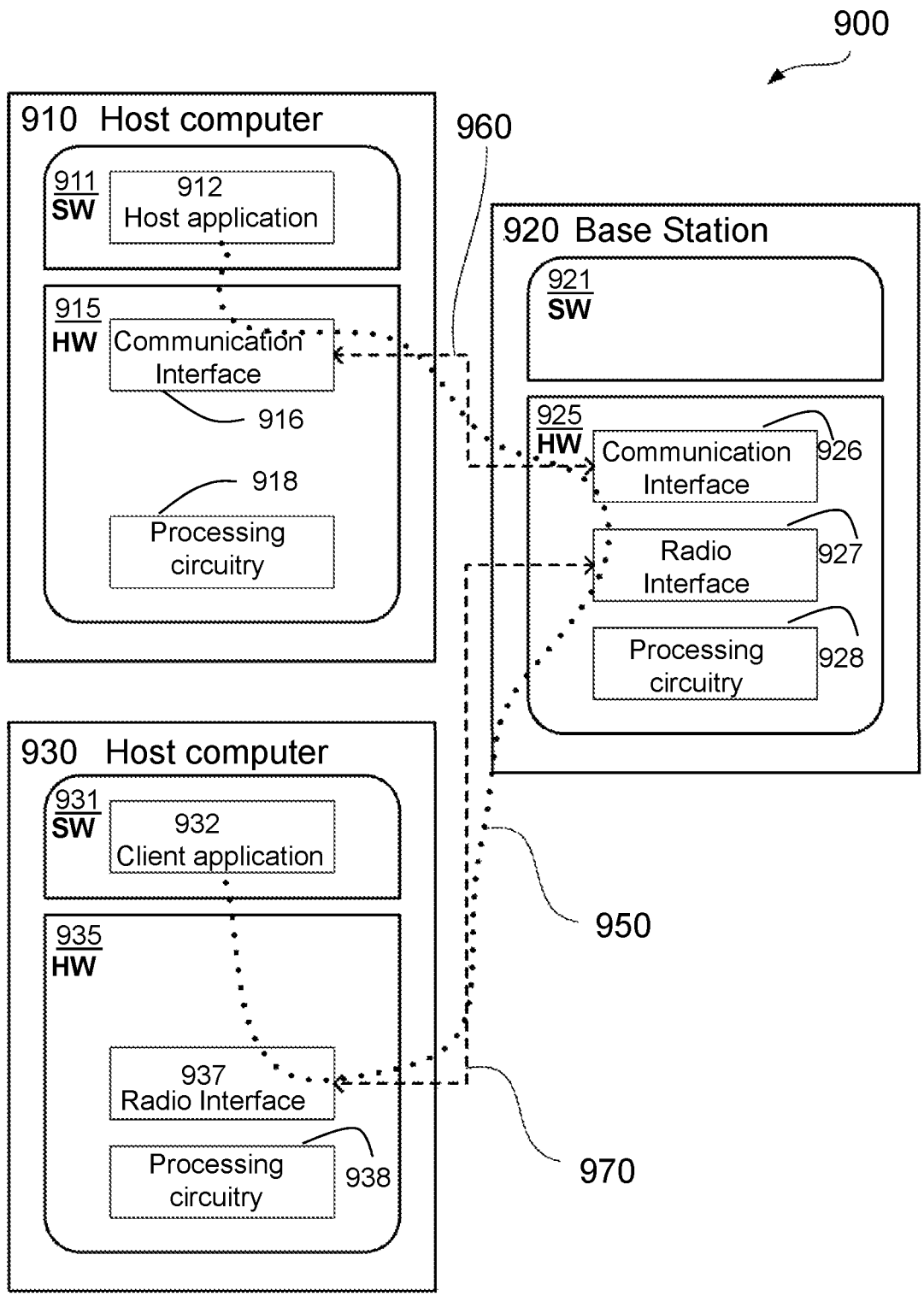
FIG. 12 illustrates a generalized block diagram of a host computer communicating via a base station with a user equipment over a partially wireless connection, according to certain embodiments.

FIG. 12 illustrates a host computer communicating via a base station with a user equipment over a partially wireless connection, in accordance with some embodiments. Example implementations, in accordance with an embodiment, of the UE, base station and host computer discussed in the preceding paragraphs are described with reference to FIG. 12.

In communication system 900, host computer 910 comprises hardware 915 including communication interface 916 configured to set up and maintain a wired or wireless connection with an interface of a different communication device of communication system 900. Host computer 910 further comprises processing circuitry 918, which may have storage and/or processing capabilities. In particular, processing circuitry 918 may comprise one or more programmable processors, application-specific integrated circuits, field programmable gate arrays or combinations of these (not shown) adapted to execute instructions. Host computer 910 further comprises software 911, which is stored in or accessible by host computer 910 and executable by processing circuitry 918. Software 911 includes host application 912. Host application 912 may be operable to provide a service to a remote user, such as UE 930 connecting via OTT connection 950 terminating at UE 930 and host computer 910. In providing the service to the remote user, host application 912 may provide user data which is transmitted using OTT connection 950.

Communication system 900 further includes base station 920 provided in a telecommunication system and comprising hardware 925 enabling it to communicate with host computer 910 and with UE 930. Hardware 925 may include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 12) served by base station 920. Communication interface 926 may be configured to facilitate connection 960 to host computer 910. Connection 960 may be direct or it may pass through a core network (not shown in FIG. 12) of the telecommunication system and/or through one or more intermediate networks outside the telecommunication system. In the embodiment shown, hardware 925 of base station 920 further includes processing circuitry 928, which may comprise one or more programmable processors, application-specific integrated circuits, field programmable gate arrays or combinations of these (not shown) adapted to execute instructions. Base station 920 further has software 921 stored internally or accessible via an external connection.

Communication system 900 further includes UE 930 already referred to. Its hardware 935 may include radio interface 937 configured to set up and maintain wireless connection 970 with a base station serving a coverage area in which UE 930 is currently located. Hardware 935 of UE 930 further includes processing circuitry 938, which may comprise one or more programmable processors, application-specific integrated circuits, field programmable gate arrays or combinations of these (not shown) adapted to execute instructions. UE 930 further comprises software 931, which is stored in or accessible by UE 930 and executable by processing circuitry 938. Software 931 includes client application 932. Client application 932 may be operable to provide a service to a human or non-human user via UE 930, with the support of host computer 910. In host computer 910, an executing host application 912 may communicate with the executing client application 932 via OTT connection 950 terminating at UE 930 and host computer 910. In providing the service to the user, client application 932 may receive request data from host application 912 and provide user data in response to the request data. OTT connection 950 may transfer both the request data and the user data. Client application 932 may interact with the user to generate the user data that it provides.

It is noted that host computer 910, base station 920 and UE 930 illustrated in FIG. 12 may be similar or identical to host computer 830, one of base stations 812*a*, 812*b*, 812*c* and one of UEs 891, 892 of FIG. 11, respectively. This is to say, the inner workings of these entities may be as shown in FIG. 12 and independently, the surrounding network topology may be that of FIG. 11.

In FIG. 12, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. More precisely, the teachings of these embodiments may improve the latency and power consumption and thereby provide benefits such as reduced user waiting time, better responsiveness, and extended battery lifetime.

A measurement procedure may be provided for the purpose of monitoring data rate, latency and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above, or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signaling facilitating host computer 910's measurements of throughput, propagation times, latency and the like. The measurements may be implemented in that software 911 and 931 causes messages to be transmitted, in particular empty or 'dummy' messages, using OTT connection 950 while it monitors propagation times, errors etc.

Figures 13, 14:
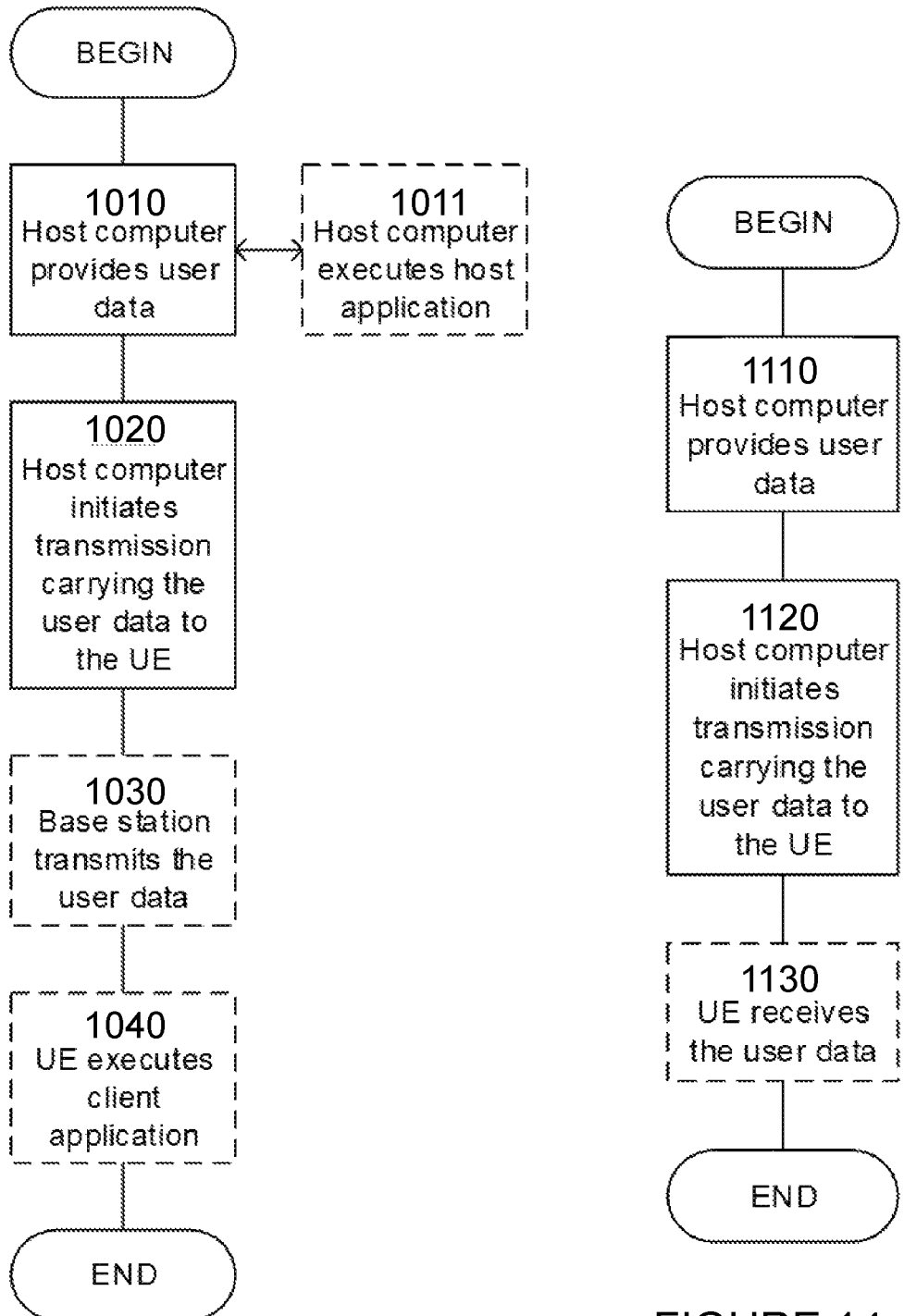
FIG. 13 illustrates a method implemented in a communication system, according to one embodiment.
FIG. 14 illustrates another method implemented in a communication system, according to one embodiment.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figures 15, 16:
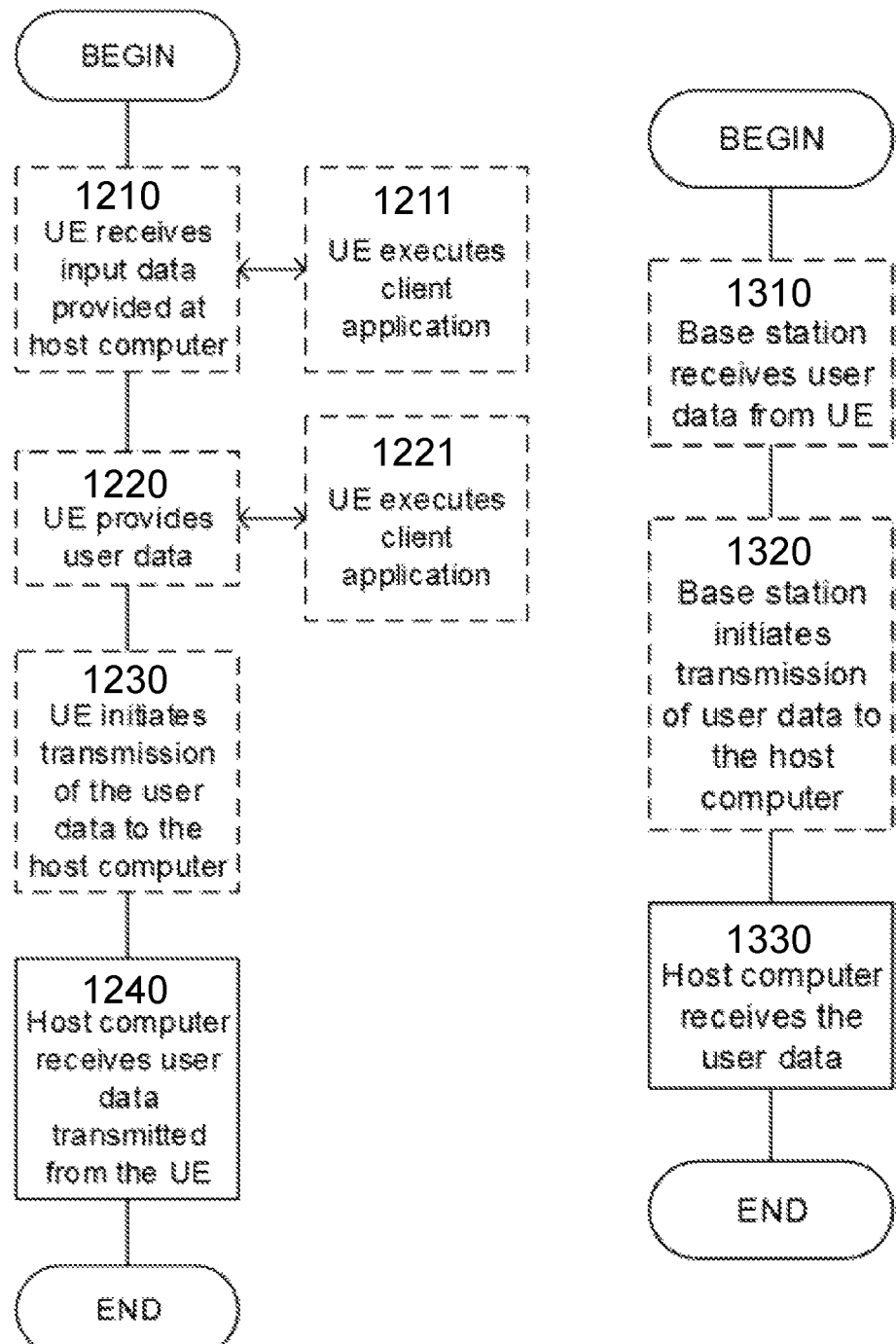
FIG. 15 illustrates another method implemented in a communication system, according to one embodiment.
FIG. 16 illustrates another method implemented in a communication system, according to one embodiment.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 17:
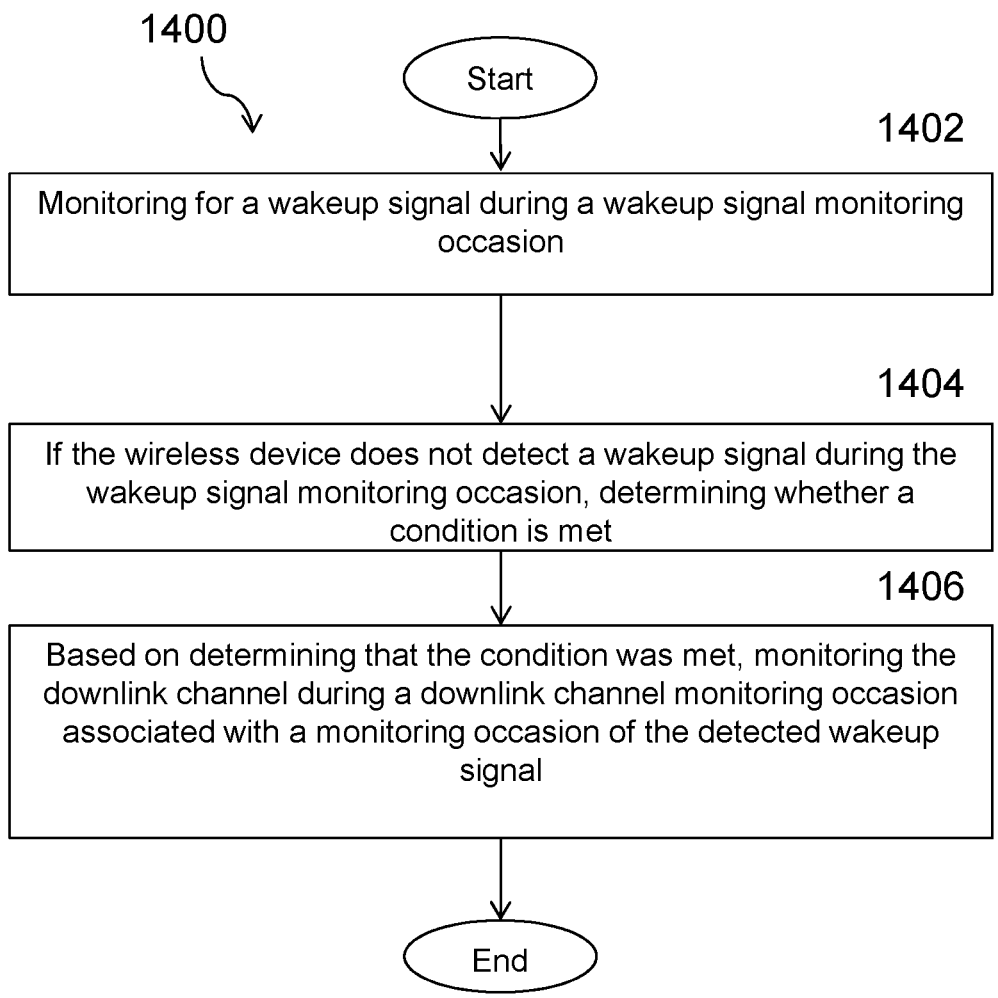
FIG. 17 illustrates an example method by a wireless device, according to certain embodiments.

FIG. 17 depicts a method 1400 in accordance with particular embodiments, the method begins at step 1402 with monitoring for a wakeup signal during a wakeup signal monitoring occasion. If the wireless device detects a wakeup signal during the wakeup signal monitoring occasion, the wireless device may monitor a downlink channel during a downlink channel monitoring occasion associated with a monitoring occasion of the detected wakeup signal. The wireless device may resume monitoring for other wakeup signals at a later time, e.g., after re-entering a sleep or DRX mode.

If, however, the wireless device does not detect a wakeup signal during the wakeup signal monitoring occasion, at step 1404, the wireless device may determine whether a condition is met. The wireless device may fail to detect a wakeup signal if no wakeup signal was sent by the network node or if the wireless device missed a wakeup signal (e.g., the network node sent a wake up signal, but the wireless device failed to receive the wakeup signal at all, or the wireless device received the wake up signal but was unable to successfully decode it). In certain embodiments, determining whether the condition is met may be based on whether conditions exist that increase the likelihood that the wireless device missed a wakeup signal that was sent by the network node. For example, a determination may be made if the wireless device is in a deep fade or other challenging RF environment. In particular, in certain embodiments, the condition may be whether a measured value, e.g., a quality metric or a decoder metric, at the wireless device is below a predetermined threshold value. In this example, the wireless device may determine the condition is met if the signal quality is below the threshold, implying that even if a wakeup signal was transmitted, the wireless device would not have been able to detect it.

At step 1406, if the condition was met, the wireless device monitors the downlink channel during a downlink channel monitoring occasion associated with a monitoring occasion of the detected wakeup signal. For example, even if the wakeup signal was not detected, the wireless device may still monitor the PDCCH as if it did. This may increase the robustness of the wireless device's wakeup signal operation to ensure it receives downlink information from the network node with less missed transmissions. Alternatively, if the condition is not met (e.g., if the wireless device is in a good RF environment), failure to detect the wakeup signal may indicate that the network node did not send any wakeup signal to the wireless device such that, in certain embodiments, the wireless device need not wakeup and monitor the PDCCH. This may conserve battery power of the wireless device under conditions where the wireless is unlikely to have missed a wakeup signal. Accordingly, a conditional wakeup signal operation may be implemented via the method shown in FIG. 17.

Figure 18:
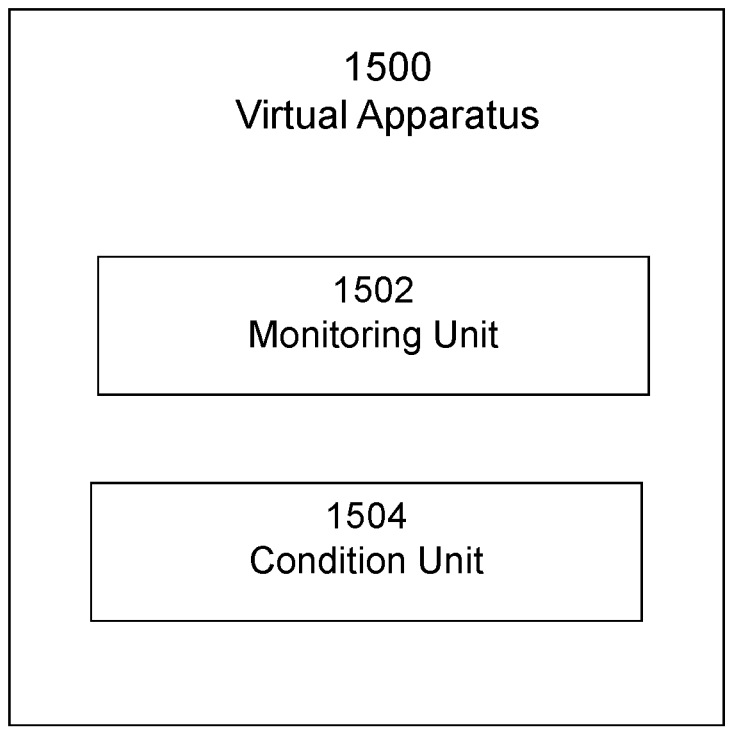
FIG. 18 illustrates an apparatus in a wireless network, according to certain embodiments.

FIG. 18 illustrates a schematic block diagram of an apparatus 1500 in a wireless network (for example, the wireless network shown in FIG. 6). The apparatus may be implemented in a wireless device or network node (e.g., wireless device 510 or network node 560 shown in FIG. 6). Apparatus 1500 is operable to carry out the example method described with reference to FIG. 17 and possibly any other processes or methods disclosed herein. It is also to be understood that the method of FIG. 17 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause monitoring unit 1502, the condition unit 1504, and any other suitable units of apparatus 1500 to perform corresponding functions according one or more embodiments of the present disclosure.

As illustrated in FIG. 18, apparatus 1500 includes monitoring unit 1502 and condition unit 1504. Monitoring unit 1502 is configured monitor for a wakeup signal during a wakeup signal monitoring occasion. If a wakeup signal is detected during the wakeup signal monitoring occasion, the downlink channel may be monitored during a downlink channel monitoring occasion associated with a monitoring occasion of the detected wakeup signal. Further monitoring for other wakeup signals may be continued at a later time, e.g., after re-entering a sleep or DRX mode. If, however, a wakeup signal is not detected during the wakeup signal monitoring occasion, condition unit 1504 may determine whether a condition is met. For example, condition unit 1504 may determine whether conditions exist that increase the likelihood that the wakeup signal was missed (e.g., the wireless device was unable to detect or decode a wakeup signal sent by the network node). In particular, in certain embodiments, the condition may be whether a measured value, e.g., a quality metric or a decoder metric, at the wireless device is below a predetermined threshold value. In this example, condition unit 1504 may determine the condition is met if the signal quality is below the threshold, implying that even if a wakeup signal was transmitted, monitoring unit 1502 would not have been able to detect it.

Additionally, monitoring unit 1502 may also monitor the downlink channel during a downlink channel monitoring occasion associated with a monitoring occasion of the detected wakeup signal. For example, even if the wakeup signal was not detected, PDCCH may be monitored as if the wakeup signal was detected. This may increase the robustness of the wakeup signal operation to ensure that downlink information is received with less missed transmissions. Accordingly, a conditional wakeup signal operation may be implemented using virtual apparatus 1500.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier, and the instructions are executable on a computer wherein when executed perform any of the embodiments disclosed herein.

Figure 19:
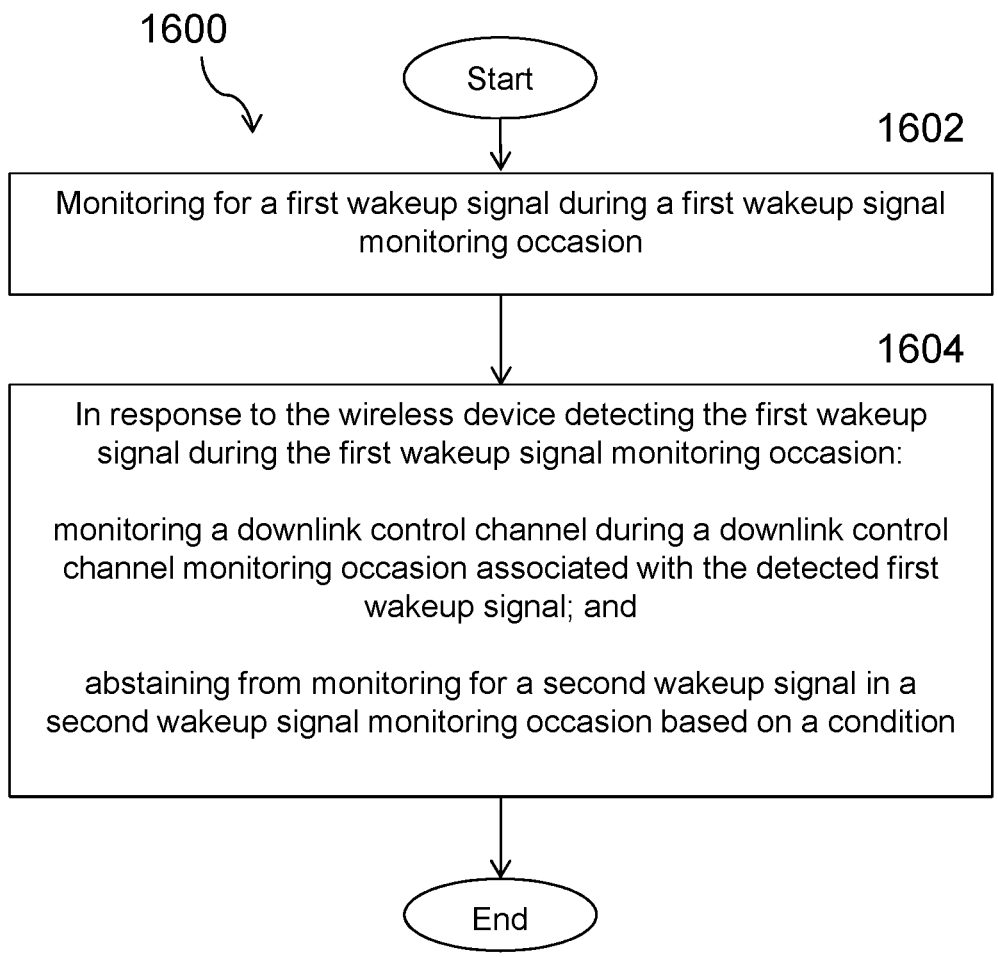
FIG. 19 illustrates another example method by a wireless device, according to certain embodiments.

FIG. 19 illustrates another example method 1600 by a wireless device 510 according to certain embodiments. The method begins at step 1602 when the wireless device 510 monitors for a first WUS during a first WUS monitoring occasion. In step 1604, in response to the wireless device 510 detecting the first WUS during the first WUS monitoring occasion, wireless device 510 monitors a downlink control channel during a downlink control channel monitoring occasion associated with the detected first WUS and abstains from monitoring for a second WUS in a second WUS monitoring occasion based on a condition.

In a particular embodiment, the condition includes the second WUS monitoring occasion overlapping an active time. In a further particular embodiment, the active time comprises a time slot during which the wireless device is monitoring the downlink control channel.

In a particular embodiment, the abstaining from monitoring the second WUS based on the condition is in response to receiving an indication from a network node 560 to not monitor for wakeup signals (WUSs) during a predetermined period of time.

In a particular embodiment, in response to detecting the first WUS, wireless device 510 detects a downlink signal while monitoring the downlink control channel, after detecting the downlink signal sets an inactivity timer associated with the predetermined period of time, abstains from monitoring for the second WUS while the inactivity timer is running during the predetermined period of time, and resets the inactivity timer in response to detecting a subsequent downlink signal in the downlink control channel before the inactivity timer expires.

In a particular embodiment, in response to the wireless device 510 detecting the first WUS during the first WUS monitoring occasion, wireless device 510 transmits, to a network node 560, an acknowledgement signal associated with the detected first WUS.

In a particular embodiment, wireless device 510 determines, based on the detected first WUS, to send the acknowledgement signal to the network node 560.

In a particular embodiment, monitoring the downlink control channel during the downlink control channel monitoring occasion associated with the detected first WUS comprises monitoring the downlink control channel during an ON duration associated with the first WUS monitoring occasion.

In a particular embodiment, while abstaining from monitoring for the second WUS in the second WUS monitoring occasion, wireless device 510 monitors the downlink control channel during at least one additional downlink control channel monitoring occasion associated with the second WUS monitoring occasion.

Figure 20:
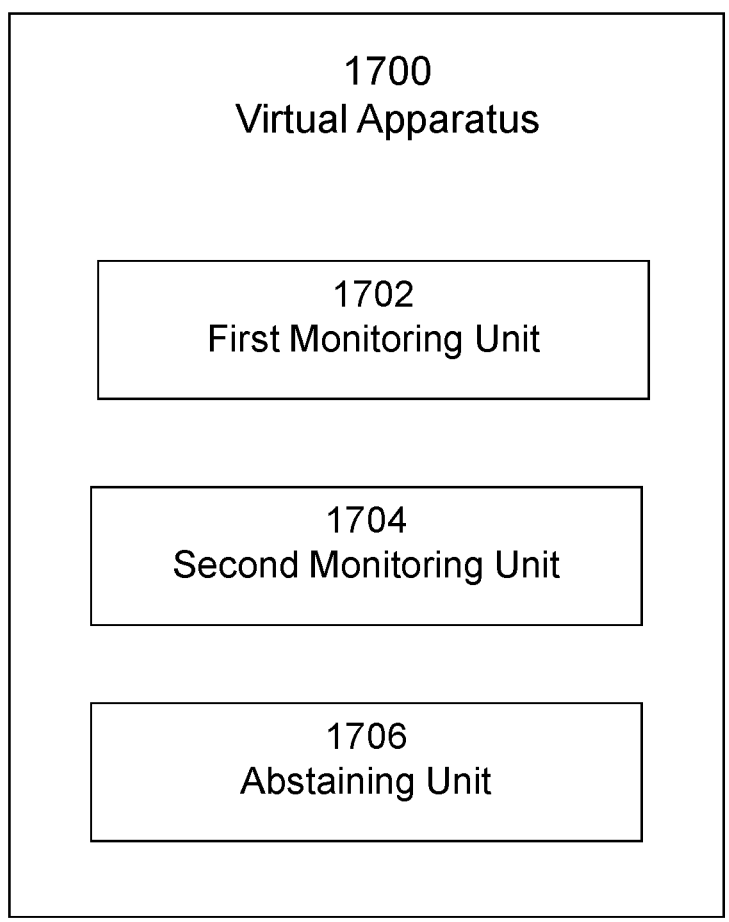
FIG. 20 illustrates another apparatus in a wireless network, according to certain embodiments.

FIG. 20 illustrates another apparatus 1700 in a wireless network (for example, the wireless network shown in FIG. 6). The apparatus may be implemented in a wireless device or network node (e.g., wireless device 510 or network node 560 shown in FIG. 6). Apparatus 1700 is operable to carry out the example method described with reference to FIG. 19 and possibly any other processes or methods disclosed herein. It is also to be understood that the method of FIG. 19 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first monitoring unit 1702, second monitoring unit 1704, abstaining unit 1706, and any other suitable units of apparatus 1700 to perform corresponding functions according one or more embodiments of the present disclosure.

As illustrated in FIG. 20, apparatus 1700 includes first monitoring unit 1702, second monitoring unit 1704, abstaining unit 1706. First monitoring unit 1702 is configured to monitor for a first WUS during a first WUS monitoring occasion. In response to the wireless device 510 detecting the first WUS during the first WUS monitoring occasion, second monitoring unit 1704 monitors a downlink control channel during a downlink control channel monitoring occasion associated with the detected first WUS. Abstaining unit 1706 abstains from monitoring for a second WUS in a second WUS monitoring occasion based on a condition.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier, and the instructions are executable on a computer wherein when executed perform any of the embodiments disclosed herein.

Figure 21:
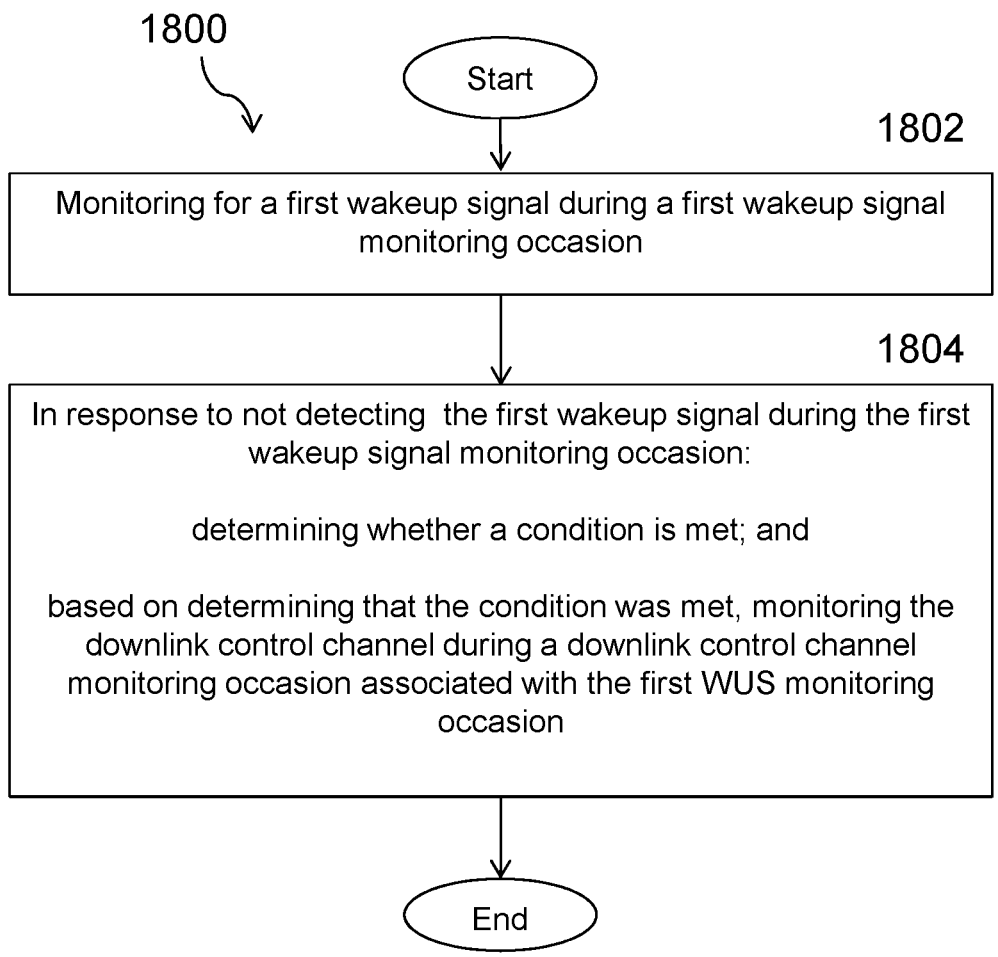
FIG. 21 illustrates still another example method by a wireless device, according to certain embodiments.

FIG. 21 illustrates still another example method 1800 by a wireless device configured for DRX, according to certain embodiments. The method begins at step 1802 when wireless device 510 monitors for a first WUS during a first WUS monitoring occasion. Then at step 1804, in response to not detecting the first WUS during the first WUS monitoring occasion, wireless device 510 determines whether a condition is met and, based on determining that the condition was met, monitors the downlink control channel during a downlink control channel monitoring occasion associated with the first WUS monitoring occasion.

In a particular embodiment, the at least one condition is met when a metric is above a threshold value. In a further particular embodiment, the metric comprises a quality metric and the condition is met when the quality metric is above a predetermined threshold. The quality metric is based on one or more of a RSRP, a RSRQ, a CSI condition, and a synchronization condition.

In a particular embodiment, wireless device 510 receives, from the network node 560, information from which the wireless device obtains the condition that the wireless device is to use in determining whether the condition is met.

Figure 22:
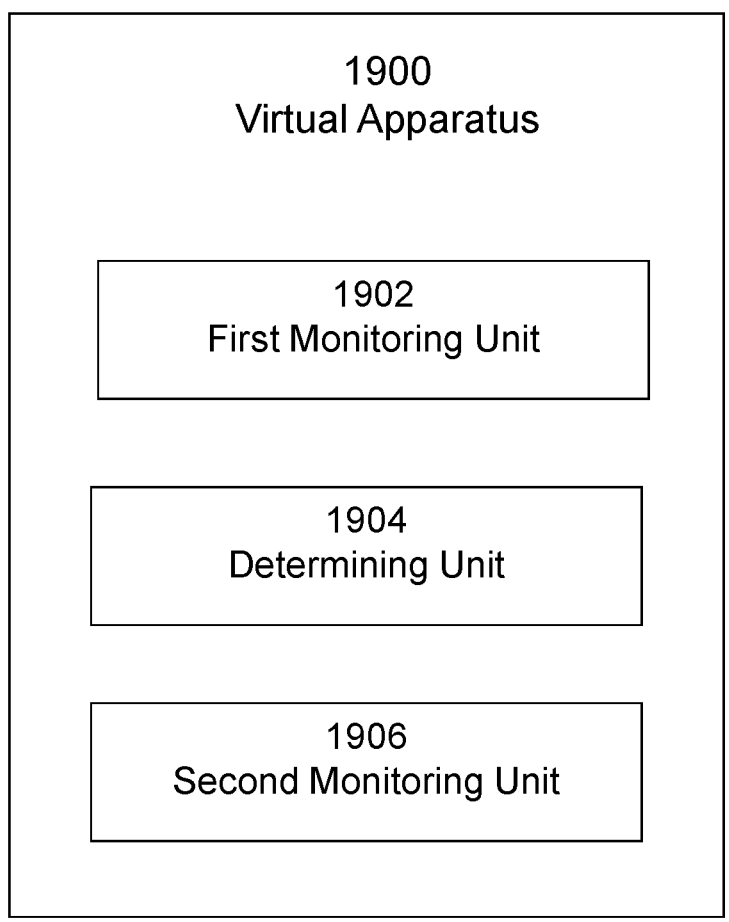
FIG. 22 illustrates still another apparatus in a wireless network, according to certain embodiments.

FIG. 22 illustrates still another apparatus 1900 in a wireless network (for example, the wireless network shown in FIG. 6). The apparatus may be implemented in a wireless device or network node (e.g., wireless device 510 or network node 560 shown in FIG. 6). Apparatus 1900 is operable to carry out the example method described with reference to FIG. 21 and possibly any other processes or methods disclosed herein. It is also to be understood that the method of FIG. 21 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first monitoring unit 1902, determining unit 1904, second monitoring unit 1906, and any other suitable units of apparatus 1900 to perform corresponding functions according one or more embodiments of the present disclosure.

As illustrated in FIG. 22, apparatus 1900 includes first monitoring unit 1902, determining unit 1904, second monitoring unit 1906. First monitoring unit 1902 is configured to monitor for a first WUS during a first WUS monitoring occasion. In response to not detecting the first WUS during the first WUS monitoring occasion, determining unit 1904 determines whether a condition is met. Based on the condition being met, second monitoring unit 1906 monitors the downlink control channel during a downlink control channel monitoring occasion associated with the first WUS monitoring occasion.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier, and the instructions are executable on a computer wherein when executed perform any of the embodiments disclosed herein.

Figure 23:
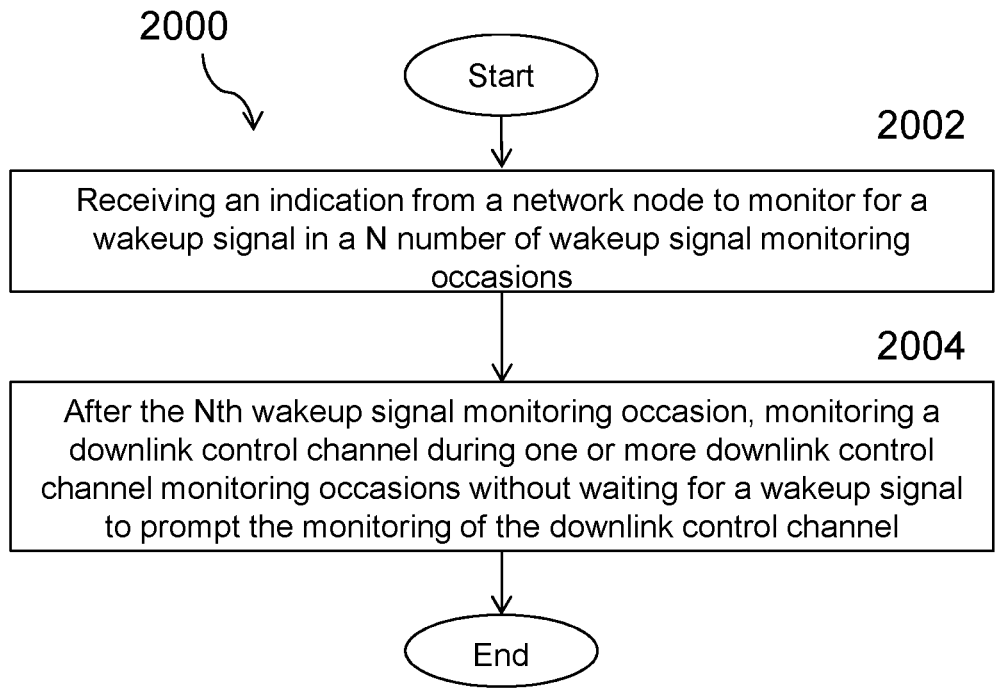
FIG. 23 illustrates yet another example method by a wireless device, according to certain embodiments.

FIG. 23 illustrates yet another example method 2000 by a wireless device 510, according to certain embodiments. The method begins at step 2002 when wireless device 510 receives an indication from a network node 560 to monitor for a WUS in a N number of WUS monitoring occasions. After the Nth WUS monitoring occasion, wireless device 510 monitors a downlink control channel during one or more downlink control channel monitoring occasions without waiting for a WUS to prompt the monitoring of the downlink control channel.

In a particular embodiment, wireless device 510 detects a WUS in one of the N WUS monitoring occasions and, in response to the detection, monitors the downlink control channel during one or more downlink control channel monitoring occasions associated with the WUS monitoring occasion.

In a particular embodiment, the indication from the network node 560 further indicates to the wireless device 510 to monitor M number of the N number of WUS monitoring occasions, wherein M<N.

Figure 24:
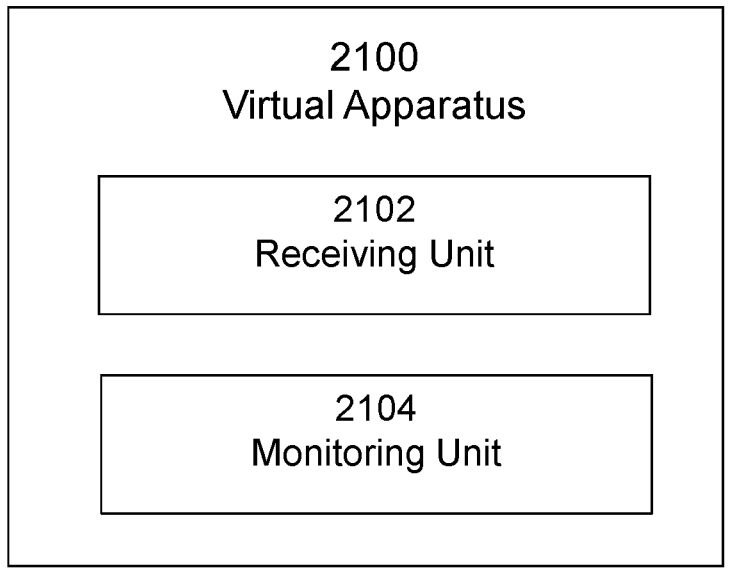
FIG. 24 illustrates yet another apparatus in a wireless network, according to certain embodiments.

FIG. 24 illustrates still another apparatus 2100 in a wireless network (for example, the wireless network shown in FIG. 6). The apparatus may be implemented in a wireless device or network node (e.g., wireless device 510 or network node 560 shown in FIG. 6). Apparatus 2100 is operable to carry out the example method described with reference to FIG. 23 and possibly any other processes or methods disclosed herein. It is also to be understood that the method of FIG. 23 is not necessarily carried out solely by apparatus 2100. At least some operations of the method can be performed by one or more other entities.

Virtual Apparatus 2100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 2102, monitoring unit 2104, and any other suitable units of apparatus 2100 to perform corresponding functions according one or more embodiments of the present disclosure.

As illustrated in FIG. 24, apparatus 2100 includes receiving unit 2102 and monitoring unit 2104. Receiving unit 2102 is configured to receive an indication from a network node 560 to monitor for a WUS in a N number of WUS monitoring occasions. After the Nth WUS monitoring occasion, monitoring unit 2104 monitors a downlink control channel during one or more downlink control channel monitoring occasions without waiting for a WUS to prompt the monitoring of the downlink control channel.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier, and the instructions are executable on a computer wherein when executed perform any of the embodiments disclosed herein.

Figure 25:
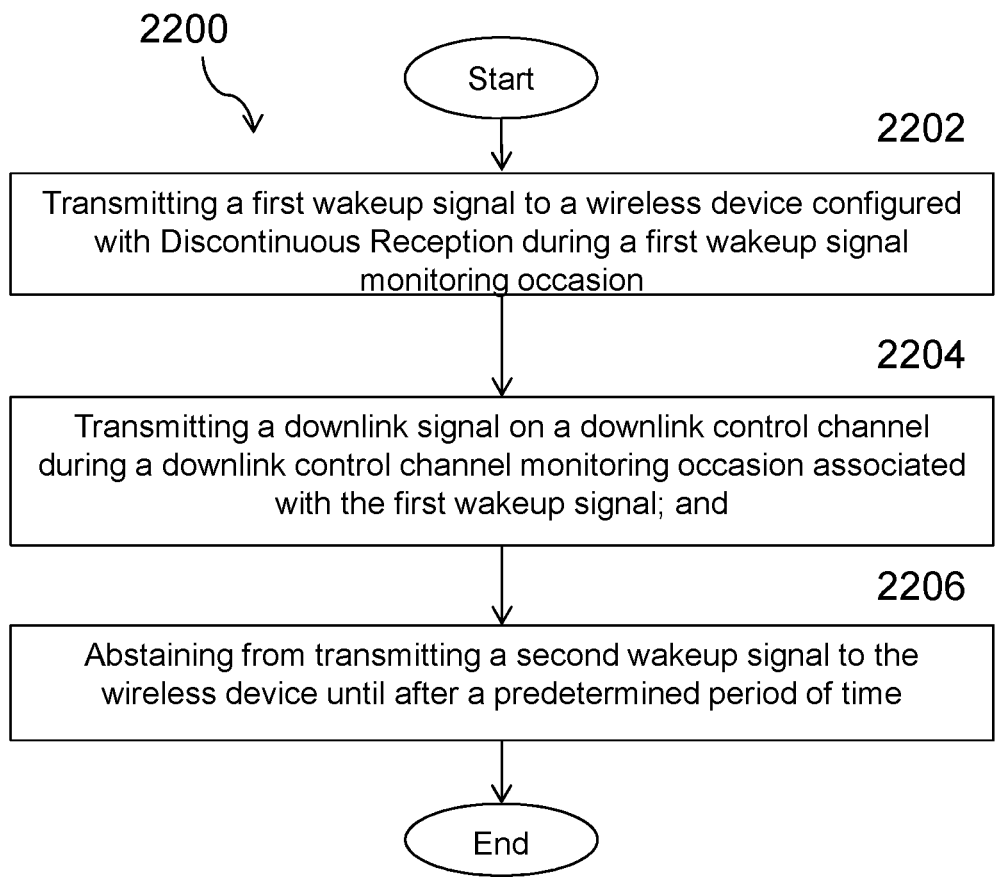
FIG. 25 illustrates an example method by a network node, according to certain embodiments.

FIG. 25 illustrates an example method 2200 by a network node 560, according to certain embodiments. The method begins at step 2202, when network node 560 transmits a first WUS to a wireless device configured with DRX, during a first WUS monitoring occasion. At step 2204, network node 560 transmits a downlink signal on a downlink control channel during a downlink control channel monitoring occasion associated with the first WUS. At step 2206, network node 560 abstains from transmitting a second WUS to the wireless device until after a predetermined period of time.

In a particular embodiment, the predetermined period of time is based on a preconfigured time period during which the wireless device abstains from monitoring for the second WUS.

In a particular embodiment, the network node 560 sends a configuration to the wireless device 510. The configuration comprises instructions for the wireless device, instructing the wireless device to, in response to detecting a downlink signal while monitoring the downlink control channel, set an inactivity timer after detecting the downlink signal and abstain from monitoring for other WUS while the inactivity timer is running and reset the inactivity timer in response to detecting a subsequent downlink signal in the downlink control channel before the inactivity timer expires.

Figure 26:
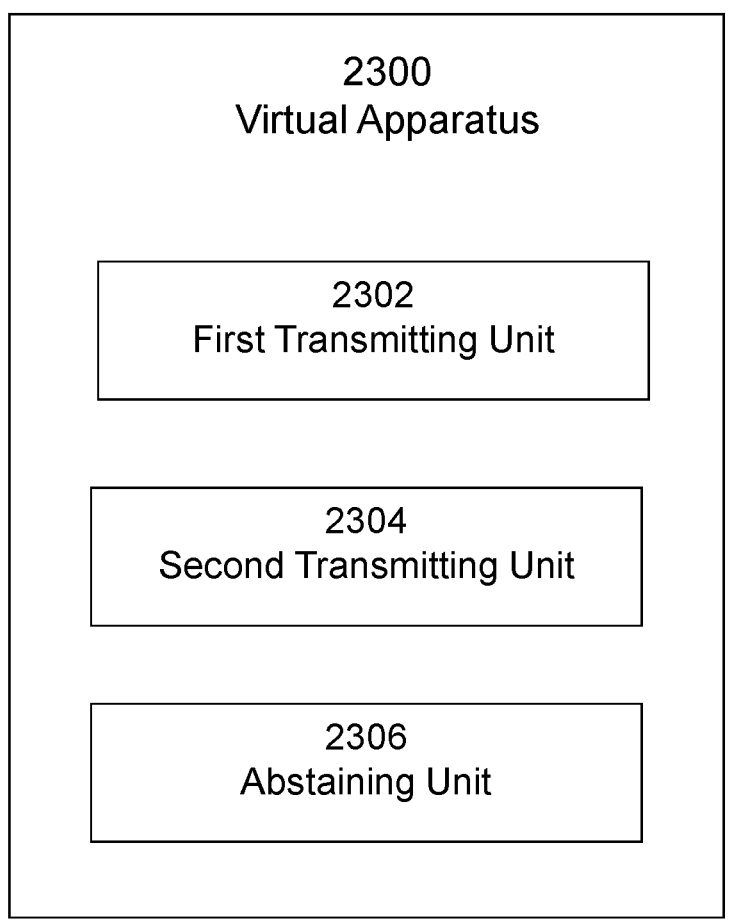
FIG. 26 illustrates another apparatus in a wireless network, according to certain embodiments.

FIG. 26 illustrates still another apparatus 2300 in a wireless network (for example, the wireless network shown in FIG. 6). The apparatus may be implemented in a wireless device or network node (e.g., wireless device 510 or network node 560 shown in FIG. 6). Apparatus 2300 is operable to carry out the example method described with reference to FIG. 25 and possibly any other processes or methods disclosed herein. It is also to be understood that the method of FIG. 25 is not necessarily carried out solely by apparatus 2300. At least some operations of the method can be performed by one or more other entities.

Virtual Apparatus 2300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first transmitting unit 2302, second transmitting unit 2304, abstaining unit 2306, and any other suitable units of apparatus 2300 to perform corresponding functions according one or more embodiments of the present disclosure.

As illustrated in FIG. 26, apparatus 2300 includes first transmitting unit 2302, second transmitting unit 2304, abstaining unit 2306. First transmitting unit 2302 is configured to transmit a first WUS to a wireless device configured with DRX, during a first WUS monitoring occasion. Second transmitting unit 2304 is configured to transmit a downlink signal on a downlink control channel during a downlink control channel monitoring occasion associated with the first WUS. Abstaining unit 2306 is configured to abstain from transmitting a second WUS to the wireless device until after a predetermined period of time.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier, and the instructions are executable on a computer wherein when executed perform any of the embodiments disclosed herein.

Figure 27:
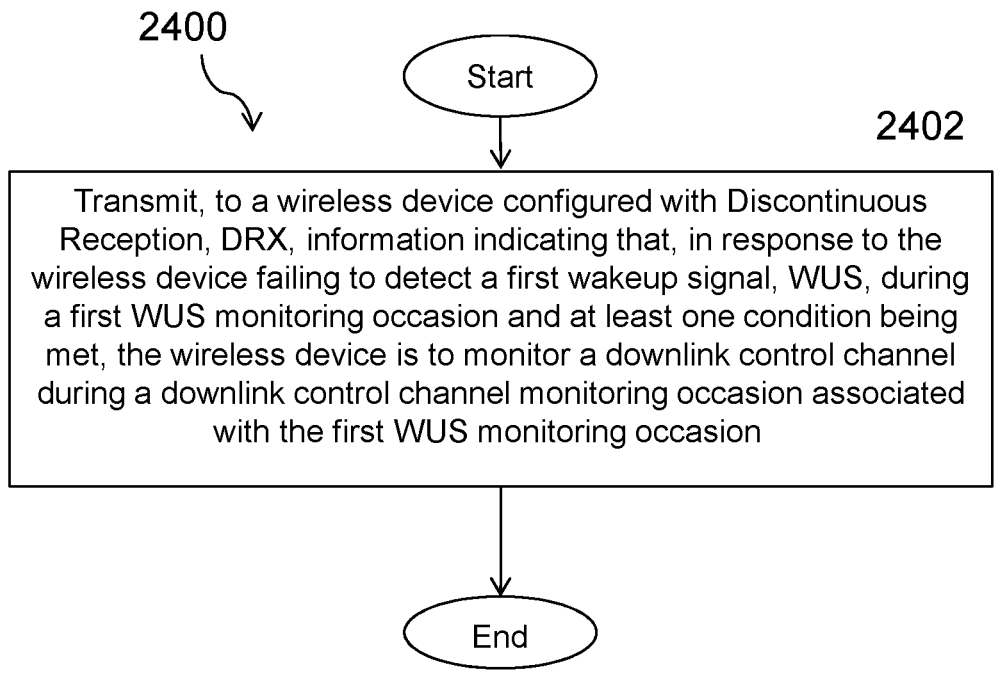
FIG. 27 illustrates another example method by a network node, according to certain embodiments.

FIG. 27 illustrates another example method 2400 by a network node 560, according to certain embodiments. The method begins at step 2402 when the network node 560 transmits, to a wireless device 510 configured for DRX, information indicating that, in response to the wireless device failing to detect a first WUS during a first WUS monitoring occasion and at least one condition being met, the wireless device 510 is to monitor a downlink control channel during a downlink control channel monitoring occasion associated with the first WUS monitoring occasion.

In a particular embodiment, the at least one condition is met when a metric is above a threshold value. In a further particular embodiment, the metric comprises a quality metric and the condition is met when the quality metric is above a predetermined threshold, wherein the quality metric is based on one or more of a RSRP, a RSRQ, a CSI condition, and a synchronization condition.

In a particular embodiment, network node 560 transmits information comprising or indicating the condition to the wireless device.

Figure 28:
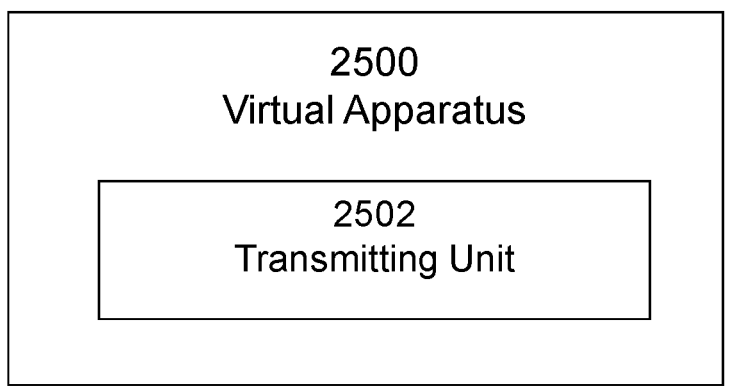
FIG. 28 illustrates still another apparatus in a wireless network, according to certain embodiments.

FIG. 28 illustrates still another apparatus 2500 in a wireless network (for example, the wireless network shown in FIG. 6). The apparatus may be implemented in a wireless device or network node (e.g., wireless device 510 or network node 560 shown in FIG. 6). Apparatus 2500 is operable to carry out the example method described with reference to FIG. 27 and possibly any other processes or methods disclosed herein. It is also to be understood that the method of FIG. 27 is not necessarily carried out solely by apparatus 2500. At least some operations of the method can be performed by one or more other entities.

Virtual Apparatus 2500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit 2502 and any other suitable units of apparatus 2500 to perform corresponding functions according one or more embodiments of the present disclosure.

As illustrated in FIG. 28, apparatus 2500 includes transmitting unit 2502, which is configured to transmit, to a wireless device 510 configured for DRX, information indicating that, in response to the wireless device failing to detect a first WUS during a first WUS monitoring occasion and at least one condition being met, the wireless device 510 is to monitor a downlink control channel during a downlink control channel monitoring occasion associated with the first WUS monitoring occasion.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier, and the instructions are executable on a computer wherein when executed perform any of the embodiments disclosed herein.

Figure 29:
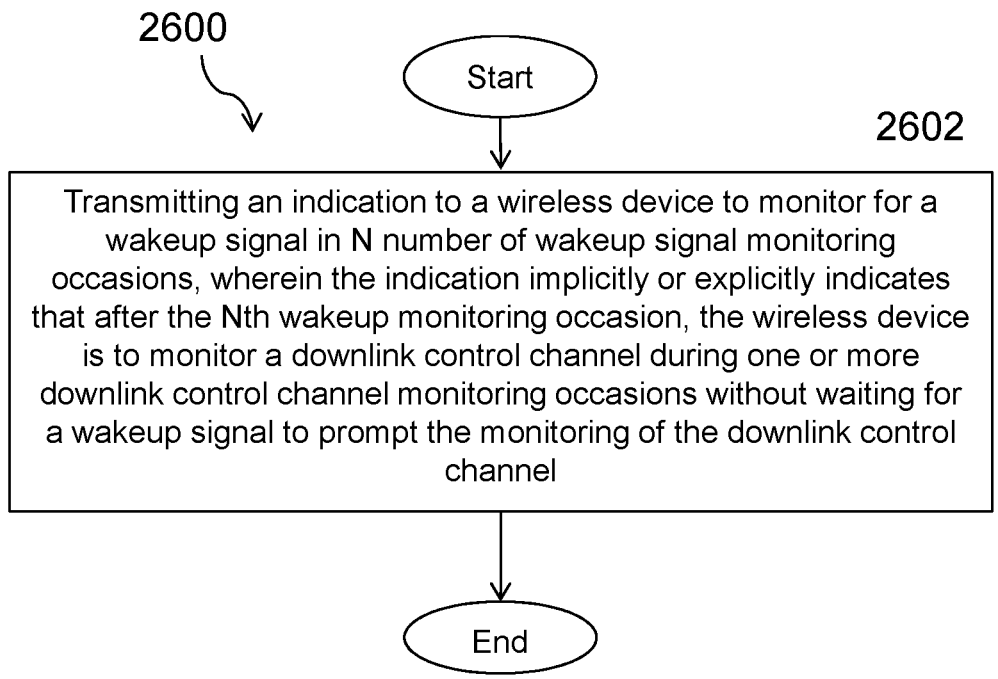
FIG. 29 illustrates yet another example method by a network node, according to certain embodiments.

FIG. 29 illustrates yet another example method 2600 by a network node 560, according to certain embodiments. The method begins at step 2602 when network node 560 transmits an indication to a wireless device 510 to monitor for a WUS in a N number of WUS monitoring occasions. The indication implicitly or explicitly indicates that after the Nth WUS monitoring occasion, the wireless device 510 is to monitor a downlink control channel during one or more downlink control channel monitoring occasions without waiting for a WUS to prompt the monitoring of the downlink control channel.

In a particular embodiment, network node 560 transmits the WUS in one of the N WUS monitoring occasions and transmits the downlink signal during a downlink control channel monitoring occasion associated with the WUS monitoring occasion.

In a particular embodiment, the indication further indicates to the wireless device 510 to monitor M number of the N number of WUS monitoring occasions, wherein M<N.

Figure 30:
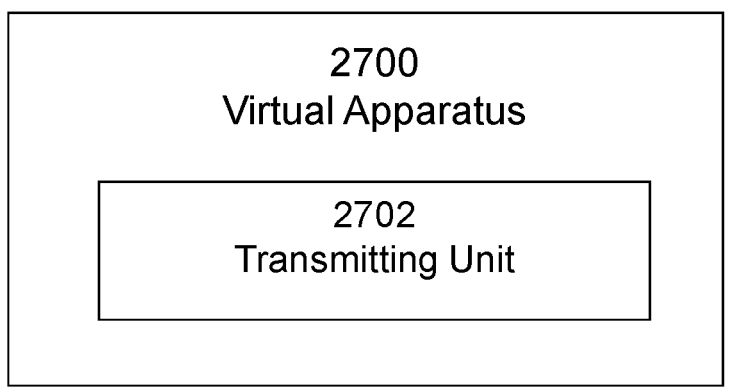
FIG. 30 illustrates yet another apparatus in a wireless network, according to certain embodiments.

FIG. 30 illustrates still another apparatus 2700 in a wireless network (for example, the wireless network shown in FIG. 6). The apparatus may be implemented in a wireless device or network node (e.g., wireless device 510 or network node 560 shown in FIG. 6). Apparatus 2700 is operable to carry out the example method described with reference to FIG. 29 and possibly any other processes or methods disclosed herein. It is also to be understood that the method of FIG. 29 is not necessarily carried out solely by apparatus 2700. At least some operations of the method can be performed by one or more other entities.

Virtual Apparatus 2700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit 2702 and any other suitable units of apparatus 2700 to perform corresponding functions according one or more embodiments of the present disclosure.

As illustrated in FIG. 30, apparatus 2700 includes transmitting unit 2702, which is configured to transmit an indication to a wireless device 510 to monitor for a WUS in a N number of WUS monitoring occasions. The indication implicitly or explicitly indicates that after the Nth WUS monitoring occasion, the wireless device 510 is to monitor a downlink control channel during one or more downlink control channel monitoring occasions without waiting for a WUS to prompt the monitoring of the downlink control channel.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier, and the instructions are executable on a computer wherein when executed perform any of the embodiments disclosed herein.

Figure 31:
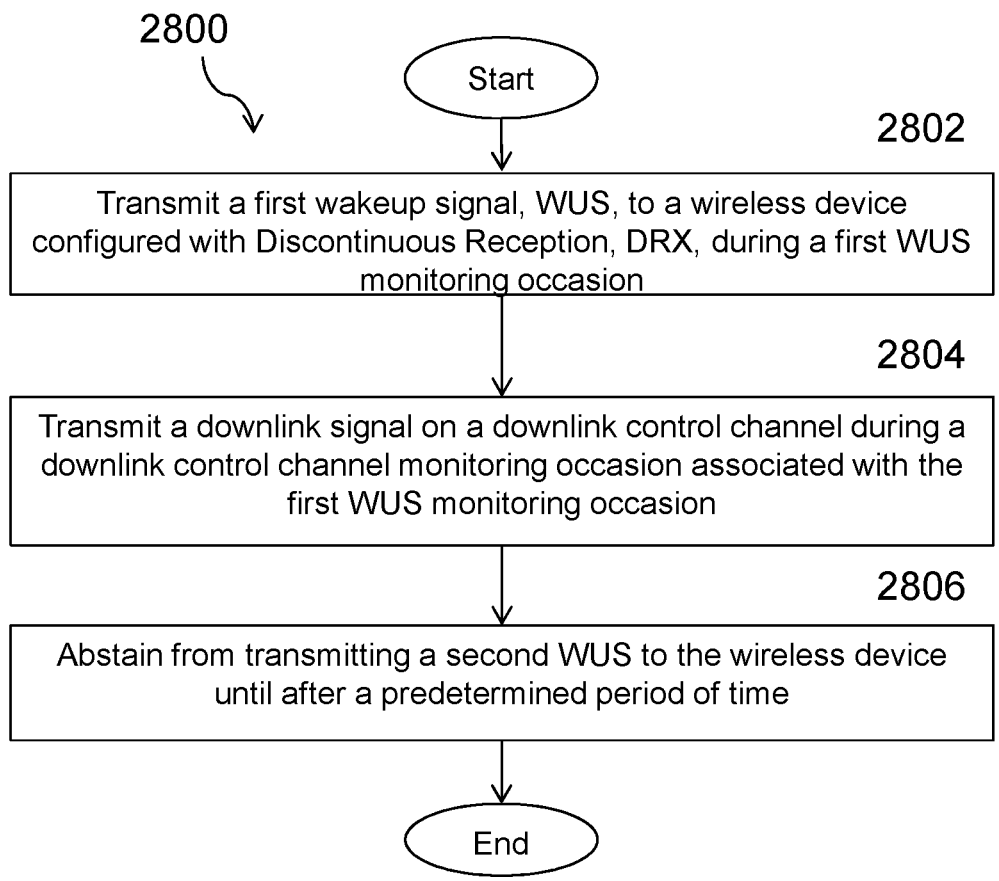
FIG. 31 illustrates yet another example method by a network node, according to certain embodiments.

FIG. 31 illustrates an example method 2800 by a network node 560, according to certain embodiments. The method begins at step 2802, when network node 560 transmits a first WUS to a wireless device 510 configured with DRX during a first WUS monitoring occasion. At step 2804, the network node 560 transmits a downlink signal on a downlink control channel during a downlink control channel monitoring occasion associated with the first WUS monitoring occasion. At step 2806, the network node abstains from transmitting a second WUS to the wireless device until after a predetermined period of time.

In a particular embodiment, abstaining from transmitting the second WUS to the wireless device until after the predetermined period of time comprises abstaining from transmitting the second WUS in a second WUS monitoring occasion based on a condition.

In a particular embodiment, the condition comprises the second WUS monitoring occasion overlapping an active time.

In a particular embodiment, the active time comprises a time slot during which the wireless device is monitoring the downlink control channel.

In a particular embodiment, the predetermined period of time is based on a preconfigured time period during which the wireless device abstains from monitoring for the second WUS.

In a particular embodiment, the network node 560 transmits, to the wireless device 510, an indication to not monitor for the second WUS.

In a particular embodiment, the network node 560 sends a configuration to the wireless device. The configuration comprises instructions for the wireless device, instructing the wireless device to, in response to detecting the downlink signal while monitoring the downlink control channel, set an inactivity timer after detecting the downlink signal, abstain from monitoring for the second WUS while the inactivity timer is running, reset the inactivity timer in response to detecting a subsequent downlink signal in the downlink control channel before the inactivity timer expires.

In a particular embodiment, in response to the wireless device detecting the first WUS during the first WUS monitoring occasion, the network node receives an acknowledgement signal associated with the detected first WUS from the wireless device.

In a particular embodiment, the network node configures the wireless device to monitor the downlink control channel during an ON duration associated with the first WUS monitoring occasion.

Figure 32:
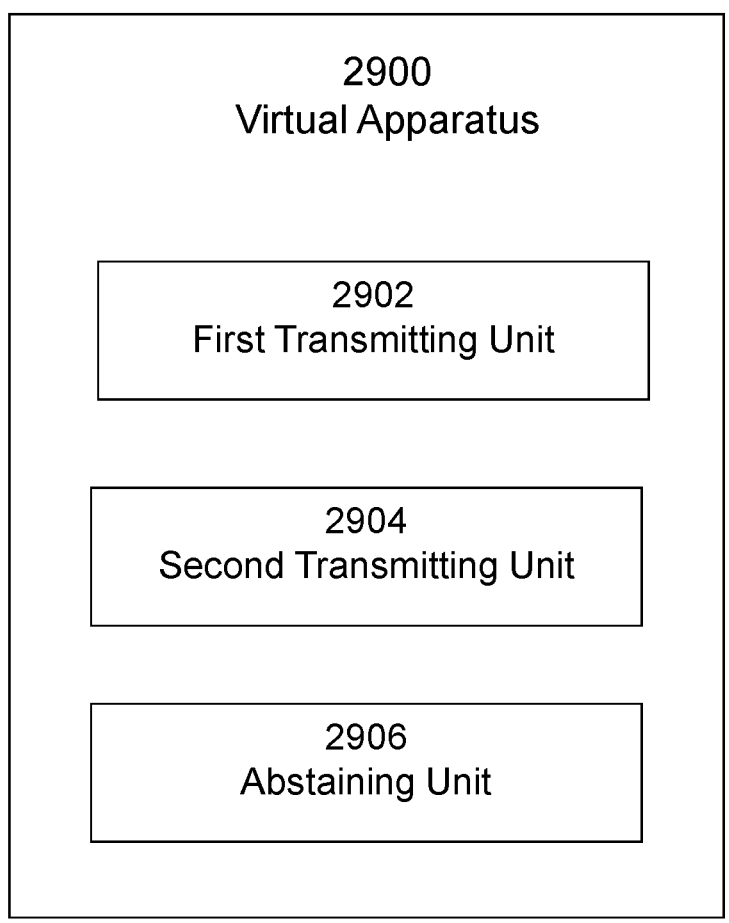
FIG. 32 illustrates yet another apparatus in a wireless network, according to certain embodiments.

FIG. 32 illustrates still another apparatus 2900 in a wireless network (for example, the wireless network shown in FIG. 6). The apparatus may be implemented in a wireless device or network node (e.g., wireless device 510 or network node 560 shown in FIG. 6). Apparatus 2900 is operable to carry out the example method described with reference to FIG. 31 and possibly any other processes or methods disclosed herein. It is also to be understood that the method of FIG. 32 is not necessarily carried out solely by apparatus 2900. At least some operations of the method can be performed by one or more other entities.

Virtual Apparatus 2900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first transmitting unit 2902, second transmitting unit 2904, abstaining unit 2906, and any other suitable units of apparatus 2900 to perform corresponding functions according one or more embodiments of the present disclosure.

As illustrated in FIG. 32, apparatus 2900 includes first transmitting unit 2902, second transmitting unit 2904, abstaining unit 2906. First transmitting unit 2902 is configured to transmit a first WUS to a wireless device 510 configured with DRX during a first WUS monitoring occasion. Second transmitting unit 2904 is configured to transmit a downlink signal on a downlink control channel during a downlink control channel monitoring occasion associated with the first WUS monitoring occasion. Abstaining unit 2306 is configured to abstain from transmitting a second WUS to the wireless device until after a predetermined period of time.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier, and the instructions are executable on a computer wherein when executed perform any of the embodiments disclosed herein.

Example Embodiments

Embodiment 1. A method performed by a wireless device, the method comprising: monitoring for a WUS during a WUS monitoring occasion; if the wireless device detects a WUS during the WUS monitoring occasion: monitoring a downlink channel during a downlink channel monitoring occasion associated with the detected WUS; abstaining from monitoring for other WUSs while monitoring the downlink channel; and resuming monitoring for other WUSs at subsequent WUS monitoring occasions;
if the wireless device does not detect a WUS during the WUS monitoring occasion, continuing to monitor for other WUSs at subsequent WUS monitoring occasions.

Embodiment 2. The method of embodiment 1, further comprising abstaining from monitoring for other WUSs based on an indication from a network node to not monitor for WUSs during specified times.

Embodiment 3. The method of any of the previous embodiments, wherein if the wireless device detects a WUS, the method further comprises: detecting a downlink signal while monitoring the downlink channel; setting an inactivity timer after detecting the downlink signal; abstaining from monitoring for other WUS while the inactivity timer is running.

Embodiment 4. The method of any of the previous embodiments, further comprising: resetting the inactivity timer in response to detecting a subsequent downlink signal in the downlink channel before the inactivity timer expired.

Embodiment 5. A method performed by a wireless device, the method comprising:
monitoring for a WUS during a WUS monitoring occasion;
if the wireless device does not detect a WUS during the WUS monitoring occasion: determining whether a condition is met; based on determining that the condition was met, monitoring the downlink channel during a downlink channel monitoring occasion associated with a monitoring occasion of the detected WUS.

Embodiment 6. The method of embodiment 5, wherein the condition is whether a quality metric is below a predetermined threshold, wherein the quality metric is based on one or more of a RSRP, a RSRQ, a CSI condition, a synchronization condition, etc.

Embodiment 7. The method of embodiment 5, wherein the condition is whether a decoding metric is below a predetermined threshold, wherein the decoding metric is one of a S-metric, a mean extrinsic information magnitude, a soft value quality metric, a message reliability, a path metric, etc.

Embodiment 8. The method of any of embodiments 5-7, further comprising: receiving information from the network node from which the wireless device obtains the condition (e.g., quality metric or decoding metric) that the wireless device is to use in determining whether the condition is met.

Embodiment 9. The method of embodiment 5, further comprising, in response to detecting a WUS during the WUS monitoring occasion, monitoring a downlink channel during a downlink channel monitoring occasion associated with the detected WUS.

Embodiment 10. The method of embodiment 9, further comprising resuming monitoring for other WUSs at subsequent WUS monitoring occasions.

Embodiment 11. The method of any of embodiments 9-10, further comprising: detecting a downlink signal on the downlink channel during the downlink channel monitoring occasion; setting an inactivity timer after detecting the downlink signal; abstaining from monitoring for other WUS while the inactivity timer is running.

Embodiment 12. A method performed by a wireless device, the method comprising:
- monitoring for a WUS during a WUS monitoring occasion;
- if the wireless device detects a WUS during the WUS monitoring occasion: transmitting an acknowledgement signal to a network node associated with the detected WUS; and monitoring a downlink channel during a downlink channel monitoring occasion associated with the detected WUS;
- if the wireless device does not detect a WUS during the WUS monitoring occasion, continuing to monitor for other WUSs at subsequent WUS monitoring occasions.

Embodiment 13. The method of embodiment 9, further comprising: determining, based on the detected WUS, to send the acknowledgement signal to the network node.

Embodiment 14. The method of embodiment 9, further comprising: receiving a configuration from a network, wherein the configuration specifies the wireless device to send an acknowledgement signal in response to detecting the WUS after a predetermined period of time or number of slots/subslots after detection.

Embodiment 15. A method performed by a wireless device, the method comprising:
- receiving an indication from a network node to monitor for a WUS in the next N number of WUS monitoring occasions;
- after the Nth WUS monitoring occasion, monitoring a downlink channel during one or more downlink channel monitoring occasions (e.g., without waiting for a WUS to prompt the monitoring of the downlink channel).

Embodiment 16. The method of embodiment 15, further comprising: detecting a WUS in one of the N WUS monitoring occasions; in response to the detection, monitoring the downlink channel one or more downlink channel monitoring occasions associated with the detected WUS.

Embodiment 17. The method of any of embodiments 15-16, wherein the indication from the network node further indicates to monitor M number of the next N number of WUS monitoring occasions, wherein M<N.

Embodiment 18. The method of any of the previous embodiments, further comprising: providing user data; and forwarding the user data to a host computer via the transmission to the base station.

Embodiment 19. A method performed by a network node, the method comprising:
- transmitting for a WUS to a wireless device during a WUS monitoring occasion;
- transmitting a downlink signal on a downlink channel during a downlink channel monitoring occasion associated with the WUS; and
- abstaining from transmitting another WUS to the wireless device until after a predetermined period of time.

Embodiment 20. The method of embodiment 19, wherein the predetermined period of time is based on a preconfigured time period during which the wireless device abstains from monitoring for other WUSs.

Embodiment 21. The method of any of the previous embodiments, sending a configuration to the wireless device, wherein the configuration comprises instructions for the wireless device, in response to detecting a downlink signal while monitoring the downlink channel, to: set an inactivity timer after detecting the downlink signal; and abstain from monitoring for other WUS while the inactivity timer is running.

Embodiment 22. A method performed by a network node, the method comprising:
- transmitting, to a wireless device, information indicating one or more conditions during which, in the event that the wireless device fails to detect a WUS during a WUS monitoring occasion, the wireless device is to monitor a downlink channel (e.g., without waiting to receive the WUS).

Embodiment 23. The method of embodiment 22, wherein the one or more conditions comprise a threshold value.

Embodiment 24. The method of any of embodiments 22-23, wherein the one or more conditions comprise a quality metric, wherein the quality metric is based on one or more of a RSRP, a RSRQ, a CSI condition, a synchronization condition, etc.

Embodiment 25. The method of any of embodiments 22-24, wherein the one or more conditions comprise a decoding metric, wherein the decoding metric is one of a S-metric, a mean extrinsic information magnitude, a soft value quality metric, a message reliability, a path metric, etc.

Embodiment 26. The method of any of embodiments 22-25, further comprising: determining the information indicating the one or more conditions.

Embodiment 27. The method of embodiment 26, wherein the information indicating the one or more conditions is determined based on a likelihood that the wireless device will fail to detect the WUS when the one or more conditions are met.

Embodiment 28. The method of any of embodiments 22-27, further comprising: transmitting a WUS to a wireless device during a WUS monitoring occasion; and transmitting a downlink signal on a downlink channel during a downlink channel monitoring occasion associated with the WUS.

Embodiment 29. A method performed by a network node, the method comprising:
- transmitting for a WUS to a wireless device during a WUS monitoring occasion; and
- receiving an acknowledgement signal to a network node associated with the detected WUS; and
- in response to the acknowledgment signal, transmitting a downlink signal on a downlink channel during a downlink channel monitoring occasion associated with the WUS.

Embodiment 30. The method of embodiment 29, further comprising: transmitting a message instructing the wireless device to send acknowledgement signals in response to detecting WUSs.

Embodiment 31. The method of embodiment 30, further comprising: determining whether to transmit the message instructing the wireless device to send the acknowledgement signals based on a range of the cell served by the network node or a quality metric value measured at the wireless device.

Embodiment 32. The method of any of embodiments 29-31, further comprising: reconfiguring WUS resources for the wireless device in response to receiving an acknowledgement signal from the wireless device.

Embodiment 33. The method of any of embodiments 29-32, further comprising: abstaining from sending a downlink signal during a downlink channel monitoring occasion if no acknowledgement signal is sent that corresponds to the downlink channel monitoring occasion.

Embodiment 34. A method performed by a network node, the method comprising:
- transmitting an indication to a wireless device to monitor for a WUS in the next N number of WUS monitoring occasions;

wherein the indication implicitly or explicitly indicates that after the Nth WUS monitoring occasion, the wireless device is to monitor a downlink channel during one or more downlink channel monitoring occasions (e.g., without waiting for a WUS to prompt the monitoring of the downlink channel).

Embodiment 35. The method of embodiment 34, further comprising: transmitting a WUS in one of the N WUS monitoring occasions; and transmitting a downlink channel on a downlink channel monitoring occasion associated with the WUS.

Embodiment 36. The method of any of embodiments 34-35, wherein the indication further indicates to the wireless device to monitor M number of the next N number of WUS monitoring occasions, wherein M<N.

Embodiment 37. The method of any of the previous embodiments, further comprising: obtaining user data; and forwarding the user data to a host computer or a wireless device.

Embodiment 38. A wireless device, the wireless device comprising:
processing circuitry configured to perform any of the steps of any of Embodiments 1 to 18; and
power supply circuitry configured to supply power to the wireless device.

Embodiment 39. A base station, the base station comprising:
processing circuitry configured to perform any of the steps of any of Embodiments 19 to 37;
power supply circuitry configured to supply power to the base station.

Embodiment 40. A user equipment (UE), the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of Embodiments 1 to 18;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

Embodiment 41. A computer program, the computer program comprising instructions which when executed on a computer perform any of the steps of any of Embodiments 1 to 18.

Embodiment 42. A computer program product comprising a computer program, the computer program comprising instructions which when executed on a computer perform any of the steps of any of Embodiments 1 to 18.

Embodiment 43. A non-transitory computer-readable storage medium or carrier comprising a computer program, the computer program comprising instructions which when executed on a computer perform any of the steps of any of Embodiments 1 to 18.

Embodiment 44. A computer program, the computer program comprising instructions which when executed on a computer perform any of the steps of any of Embodiments 19 to 37.

Embodiment 45. A computer program product comprising a computer program, the computer program comprising instructions which when executed on a computer perform any of the steps of any of Embodiments 19 to 37.

Embodiment 46. A non-transitory computer-readable storage medium or carrier comprising a computer program, the computer program comprising instructions which when executed on a computer perform any of the steps of any of Embodiments 19 to 37.

Embodiment 47. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of Embodiments 19 to 37.

Embodiment 48. The communication system of the pervious embodiment further including the base station.

Embodiment 49. The communication system of the previous 2 embodiments, further including the UE, wherein the UE is configured to communicate with the base station.

Embodiment 50. The communication system of the previous 3 embodiments, wherein: the processing circuitry of the host computer is configured to execute a host application, thereby providing the user data; and the UE comprises processing circuitry configured to execute a client application associated with the host application.

Embodiment 51. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of Embodiments 19 to 37.

Embodiment 52. The method of the previous embodiment, further comprising, at the base station, transmitting the user data.

Embodiment 53. The method of the previous 2 embodiments, wherein the user data is provided at the host computer by executing a host application, the method further comprising, at the UE, executing a client application associated with the host application.

Embodiment 54. A user equipment (UE) configured to communicate with a base station, the UE comprising a radio interface and processing circuitry configured to performs the of the previous 3 embodiments.

Embodiment 55. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of Embodiments 1 to 18.

Embodiment 56. The communication system of the previous embodiment, wherein the cellular network further includes a base station configured to communicate with the UE.

Embodiment 57. The communication system of the previous 2 embodiments, wherein:

the processing circuitry of the host computer is configured to execute a host application, thereby providing the user data; and the UE's processing circuitry is configured to execute a client application associated with the host application.

Embodiment 58. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of Embodiments 1 to 18.

Embodiment 59. The method of the previous embodiment, further comprising at the UE, receiving the user data from the base station.

Embodiment 60. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of Embodiments 1 to 18.

Embodiment 61. The communication system of the previous embodiment, further including the UE.

Embodiment 62. The communication system of the previous 2 embodiments, further including the base station, wherein the base station comprises a radio interface configured to communicate with the UE and a communication interface configured to forward to the host computer the user data carried by a transmission from the UE to the base station.

Embodiment 63. The communication system of the previous 3 embodiments, wherein:

the processing circuitry of the host computer is configured to execute a host application; and the UE's processing circuitry is configured to execute a client application associated with the host application, thereby providing the user data.

Embodiment 64. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

Embodiment 65. A method implemented in a communication system including a host computer, a base station and a user equipment (UE), the method comprising:

at the host computer, receiving user data transmitted to the base station from the UE, wherein the UE performs any of the steps of any of Embodiments 1 to 18.

Embodiment 66. The method of the previous embodiment, further comprising, at the UE, providing the user data to the base station.

Embodiment 67. The method of the previous 2 embodiments, further comprising:

at the UE, executing a client application, thereby providing the user data to be transmitted; and at the host computer, executing a host application associated with the client application.

Embodiment 68. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

Embodiment 69. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of Embodiments 19 to 37.

Embodiment 70. The communication system of the previous embodiment further including the base station.

Embodiment 71. The communication system of the previous 2 embodiments, further including the UE, wherein the UE is configured to communicate with the base station.

Embodiment 72. The communication system of the previous 3 embodiments, wherein:

the processing circuitry of the host computer is configured to execute a host application;

the UE is configured to execute a client application associated with the host application, thereby providing the user data to be received by the host computer.

Embodiment 73. A method implemented in a communication system including a host computer, a base station and a user equipment (UE), the method comprising:

at the host computer, receiving, from the base station, user data originating from a transmission which the base station has received from the UE, wherein the UE performs any of the steps of any of Embodiments 1 to 18.

Embodiment 74. The method of the previous embodiment, further comprising at the base station, receiving the user data from the UE.

Embodiment 75. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

RSRP Reference Signal Received Power
CSI-RSRP CSI Reference Signal Received Power
CSI-RSRQ CSI Reference Signal Received Quality
SS-RSRP Synchronization Signal Reference Signal Received Power
SS-RSRQ Synchronization Signal Reference Signal Received Quality
TBS Transport block size
SCS Subcarrier spacing
eMBB enhanced Mobile BroadBand
LTE Long Term Evolution
NR Next Radio
PDCCH Physical Downlink Control Channel
UE User Equipment
1×RTT CDMA2000 1× Radio Transmission Technology
3GPP 3rd Generation Partnership Project
5G 5th Generation
ABS Almost Blank Subframe
ARQ Automatic Repeat Request AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/NoCPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:
1. A method performed by a wireless device configured with Discontinuous Reception, DRX, the method comprising:
monitoring for a first wakeup signal, WUS, during a first WUS monitoring occasion;
in response to the wireless device detecting the first WUS during the first WUS monitoring occasion:
monitoring a downlink control channel during a downlink control channel monitoring occasion comprising a DRX ON duration associated with the detected first WUS; and abstaining from monitoring for a second WUS in a second WUS monitoring occasion based on a condition, wherein the condition comprises the second WUS monitoring occasion overlapping a time when an inactivity timer is running.

2. A method performed by a network node, the method comprising:
transmitting a first wakeup signal, WUS, to a wireless device;
configured with Discontinuous Reception, DRX, during a first WUS monitoring occasion;
transmitting a downlink signal on a downlink control channel during a downlink control channel monitoring occasion comprising a DRX ON duration associated with the first WUS monitoring occasion; and
abstaining from transmitting a second WUS to the wireless device until after a predetermined period of time, wherein abstaining from transmitting the second WUS to the wireless device until after the predetermined period of time comprises abstaining from transmitting the second WUS in a second WUS monitoring occasion based on a condition and wherein the condition comprises the second WUS monitoring occasion overlapping a time when an inactivity timer is running.

3. A wireless device configured for Discontinuous Reception, DRX, the wireless device comprising:
processing circuitry configured to:
monitor for a first wakeup signal, WUS, during a first WUS monitoring occasion;
in response to the wireless device detecting the first WUS during the first WUS monitoring occasion:
monitor a downlink control channel during a downlink control channel monitoring occasion comprising a DRX ON duration associated with the detected first WUS; and
abstain from monitoring for a second WUS in a second WUS monitoring occasion based on a condition, wherein the condition comprises the second WUS monitoring occasion overlapping a time when an inactivity timer is running.

4. The wireless device of claim 3, wherein the condition comprises the first WUS monitoring occasion overlapping an active time.

5. The wireless device of claim 4, wherein the active time comprises a time slot during which the wireless device is monitoring the downlink control channel.

6. The wireless device of claim 3, wherein the abstaining from monitoring for the second WUS based on the condition is in response to receiving an indication from a network node to not monitor for wakeup signal, WUS, during a predetermined period of time.

7. The wireless device of claim 3, wherein in response to detecting the first WUS, the processing circuitry is configured to:
detect a downlink signal while monitoring the downlink control channel;
after detecting the downlink signal, set the inactivity timer associated with a predetermined period of time;
abstain from monitoring for the second WUS while the inactivity timer is running during the predetermined period of time; and
reset the inactivity timer in response to detecting a subsequent downlink signal in the downlink control channel before the inactivity timer expires.

8. The wireless device of claim 3, wherein the processing circuitry is configured to:
in response to the wireless device detecting the first WUS during the first WUS monitoring occasion, transmit, to a network node, an acknowledgement signal associated with the detected first WUS.

9. The wireless device of claim 8, wherein the processing circuitry is configured to determine, based on the detected first WUS, to send the acknowledgement signal to the network node.

10. The wireless device of claim 3, wherein the processing circuitry is configured to:
while abstaining from monitoring for the second WUS in the second WUS monitoring occasion, monitor the downlink control channel during at least one additional downlink control channel monitoring occasion associated with the second WUS monitoring occasion.

11. A wireless device configured for Discontinuous Reception, DRX, the wireless device comprising:
processing circuitry configured to:
monitor for a first wakeup signal, WUS, during a first WUS monitoring occasion;
in response to not detecting the first WUS during the first WUS monitoring occasion:
determine whether a condition is met;
based on determining that the condition was met, monitor the downlink control channel during a downlink control channel monitoring occasion associated with the first WUS monitoring occasion.

12. The wireless device of claim 11, wherein the at least one condition is met when a metric is above a threshold value.

13. The wireless device of claim 11, wherein the metric comprises a quality metric and the condition is met when the quality metric is above a predetermined threshold, wherein the quality metric is based on one or more of a Reference Signal Received Power, RSRP, a Reference Signal Received Quality, RSRQ, a Channel State Information, CSI, condition, and a synchronization condition.

14. The wireless device of claim 11, wherein the processing circuitry is configured to receive, from a network node, information from which the wireless device is configured to obtain the condition that the wireless device is to use in determining whether the condition is met.

15. A network node comprising:
processing circuitry configured to:
transmit a first wakeup signal, WUS, to a wireless device configured for Discontinuous Reception, DRX, during a first WUS monitoring occasion;
transmit a downlink signal on a downlink control channel during a downlink control channel monitoring occasion comprising a DRX ON duration associated with the first WUS monitoring occasion; and
abstain from transmitting a second WUS to the wireless device until after a predetermined period of time, wherein the processing circuitry being configured to abstain from transmitting the second WUS to the wireless device until after the predetermined period of time comprises the processing circuitry being configured to abstain from transmitting the second WUS in a second WUS monitoring occasion based on a condition and wherein the condition comprises the second WUS monitoring occasion overlapping a time when an inactivity timer is running.

16. The network node of claim 15, wherein the condition comprises the first WUS monitoring occasion overlapping an active time.

17. The network node of claim 16, wherein the active time comprises a time slot during which the wireless device is monitoring the downlink control channel.

18. The network node of claim 15, wherein the predetermined period of time is based on a preconfigured time period during which the wireless device abstains from monitoring for the second WUS.

19. The network node of claim 15, wherein the processing circuitry is configured to transmit, to the wireless device, an indication to not monitor for the second WUS.

20. The network node of claim 17, wherein the processing circuitry is configured to:
   send a configuration to the wireless device, wherein the configuration comprises instructions for the wireless device, instructing the wireless device to, in response to detecting the downlink signal while monitoring the downlink control channel:
   set the inactivity timer after detecting the downlink signal; and
   abstain from monitoring for the second WUS while the inactivity timer is running; and
   reset the inactivity timer in response to detecting a subsequent downlink signal in the downlink control channel before the inactivity timer expires.

21. The network node of claim 15, wherein the processing circuitry is configured to:
   in response to the wireless device detecting the first WUS during the first WUS monitoring occasion, receive an acknowledgement signal associated with the detected first WUS from the wireless device.

22. The network node claim 15, wherein the processing circuitry is configured to configure the wireless device to monitor the downlink control channel during the DRX ON duration.

23. A network node comprising: processing circuitry configured to:
   transmit, to a wireless device configured for Discontinuous Reception, DRX, information indicating that in response to the wireless device failing to detect a first wakeup signal, WUS, during a first WUS monitoring occasion and at least one condition being met, the wireless device is to monitor a downlink control channel during a downlink control channel monitoring occasion associated with the first WUS monitoring occasion.

24. The network node of claim 23, wherein the at least one condition is met when a metric is above a threshold value.

25. The network node of claim 23, wherein the metric comprises a quality metric and the condition is met when the quality metric is above a predetermined threshold, wherein the quality metric is based on one or more of a Reference Signal Received Power, RSRP, a Reference Signal Received Quality, RSRQ, a Channel State Information, CSI, condition, and a synchronization condition.

26. The network node of claim 23, wherein the processing circuitry is configured to transmit information comprising or indicating the condition to the wireless device.

\* \* \* \* \*